(12) United States Patent
Wright et al.

(10) Patent No.: US 8,012,446 B1
(45) Date of Patent: Sep. 6, 2011

(54) RECYCLE TSA REGEN GAS TO BOILER FOR OXYFUEL OPERATIONS

(75) Inventors: Andrew David Wright, Guildford (GB); Kevin Boyle Fogash, Wescosville, PA (US); Vincent White, Ashtead (GB); Jeffrey William Kloosterman, Allentown, PA (US); Timothy Christopher Golden, Allentown, PA (US); Paul Higginbotham, Guildford (GB)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 12/832,117

(22) Filed: Jul. 8, 2010

(51) Int. Cl.
*C01B 31/20* (2006.01)

(52) U.S. Cl. ........... 423/437.1; 95/116; 95/117; 95/129; 95/135; 95/137; 95/139; 95/140; 95/148; 96/108; 96/121; 96/130; 96/134; 96/144

(58) Field of Classification Search ............... 95/116, 95/117, 129, 135, 137, 139, 140, 148; 96/108, 96/121, 130, 134, 144; 423/437.1
See application file for complete search history.

(56) References Cited

U.S. PATENT DOCUMENTS

| | | | |
|---|---|---|---|
| 4,336,044 A * | 6/1982 | Barker et al. ................... | 62/635 |
| 5,614,000 A | 3/1997 | Kalbassi et al. | |
| 5,906,675 A | 5/1999 | Jain et al. | |
| 5,914,455 A | 6/1999 | Jain et al. | |
| 6,511,640 B1 | 1/2003 | Kumar et al. | |
| 7,416,716 B2 | 8/2008 | Allam et al. | |
| 2003/0064014 A1 | 4/2003 | Kumar et al. | |
| 2003/0164092 A1 | 9/2003 | Golden et al. | |
| 2008/0176174 A1 | 7/2008 | White et al. | |
| 2009/0013717 A1 | 1/2009 | Darde et al. | |
| 2009/0013868 A1 | 1/2009 | Darde et al. | |
| 2009/0013871 A1 | 1/2009 | Darde et al. | |

FOREIGN PATENT DOCUMENTS

| | | |
|---|---|---|
| EP | 0417922 | 3/1991 |
| EP | 0410845 | 12/1994 |
| FR | 2918578 | 1/2009 |
| WO | 2009010690 | 1/2009 |
| WO | 2009010691 | 1/2009 |

OTHER PUBLICATIONS

Counce, R. M.; "A Literature Review of Nitrogen Oxide Absorption Into Water and Dilute Nitric Acid;" sponsored by an agency of the US Govenment. Aug. 1977.

Dillon, et al; "Oxy-Combustion Processes for CO2 Capture from Advanced Supercritical PF and NGCC Power Plant;" presented at GHGT-7 Vancouver, Sep. 2004.

(Continued)

Primary Examiner — Timothy C Vanoy
(74) Attorney, Agent, or Firm — Willard Jones, II

(57) ABSTRACT

$NO_2$ may be removed from a carbon dioxide feed gas comprising $NO_x$ and at least one "non-condensable" gas as contaminants by passing the feed gas at a first elevated pressure through a first adsorption system that selectively adsorbs at least $NO_2$ to produce at least substantially $NO_2$-free carbon dioxide gas. The adsorption system is at least partially regenerated using a carbon dioxide-rich gas recovered from the substantially $NO_2$-free carbon dioxide gas after purification. The invention has particular application in removing $NO_x$ and water from flue gas generated by oxyfuel combustion.

25 Claims, 4 Drawing Sheets

OTHER PUBLICATIONS

Jordal; et al; "Oxyfuel Combustion for Coal-Fired Power Generation with CO2 Capture-Opportunities and Challenges;" GHGT-7 Vancouver, 2004.

Petrocelli, et al; U.S. Appl. No. 12/832,096, filed Jul. 8, 2010; "Integration of Catalytic CO2 Oxidation and Oxyfuel Sour Compression."

Petrocelli, et al; U.S. Appl. No. 12/832,204, filed Jul. 8, 2010; "Sorbent use with Oxyfuel Sour Compression".

White et al; U.S. Appl. No. 12/832,095, filed Jul. 8, 2010; "Handling of Acids from Compressed Oxyfuel-Derived CO2."

Wright et al; U.S. Appl. No. 12/832,156, filed Jul. 8, 2010; "Treatment of Flue Gas From an Oxyfuel Combustion Process".

Diamond, Barry Wayne; U.S. Appl. No. 12/832,120, filed Jul. 8, 2010; "Removal of Acid Mists".

* cited by examiner

RECYCLE TSA REGEN GAS TO BOILER FOR OXYFUEL OPERATIONS

BACKGROUND OF THE INVENTION

The present invention relates to a method for removing at least nitrogen dioxide ($NO_2$) from carbon dioxide gas comprising $NO_x$ and at least one "non-condensable" gas as contaminants. The method typically also removes from the feed gas one or more of at least NO, $N_2O$, water, $SO_x$ and CO if present in the gas as further contaminants. The invention has particular application in the purification of crude carbon dioxide, e.g. flue gas generated by oxyfuel combustion of a fuel such as hydrocarbons, carbonaceous fuels and biomass. The method has particular application in treating flue gas from a power station in which pulverized coal is combusted in a boiler to produce steam for electric power generation.

The term "$SO_x$" means oxides of sulfur and includes sulfur dioxide ($SO_2$) and sulfur trioxide ($SO_3$). The term "$NO_x$" means oxides of nitrogen and includes primarily NO and nitrogen dioxide ($NO_2$). $NO_x$ may comprise one or more other oxides of nitrogen including $N_2O$, $N_2O_4$ and $N_2O_3$.

It has been asserted that one of the main causes of global warming is the rise in greenhouse gas contamination in the atmosphere due to anthropological effects. The main greenhouse gas which is being emitted, carbon dioxide ($CO_2$), has risen in concentration in the atmosphere from 270 ppm before the industrial revolution to the current figure of about 378 ppm. Further rises in $CO_2$ concentration are inevitable until $CO_2$ emissions are curbed. The main sources of $CO_2$ emission are fossil fuel fired electric power stations and from petroleum fuelled vehicles.

The use of fossil fuels is necessary in order to continue to produce the quantities of electric power that nations require to sustain their economies and lifestyles. There is, therefore, a need to devise efficient means by which $CO_2$ may be captured from power stations burning fossil fuel so that it can be stored rather than being vented into the atmosphere. Storage may be deep undersea; in a geological formation such as a saline aquifer; or a depleted oil or natural gas formation. Alternatively, the $CO_2$ could be used for enhanced oil recovery (EOR).

The oxyfuel combustion process seeks to mitigate the harmful effects of $CO_2$ emissions by producing a net combustion product gas consisting of $CO_2$ and water vapor by combusting a carbonaceous or hydrocarbon fuel in pure oxygen. This process would result in an absence of nitrogen ($N_2$) in the flue gas, together with a very high combustion temperature which would not be practical in a furnace or boiler. In order to moderate the combustion temperature, part of the total flue gas stream is typically recycled, usually after cooling, back to the burner.

An oxyfuel process for $CO_2$ capture from a pulverized coal-fired power boiler is described in a paper entitled "*Oxy-combustion processes for $CO_2$ capture from advanced supercritical PF and NGCC power plants*" (Dillon et al; presented at GHGT-7, Vancouver, September 2004), the disclosure of which is incorporated herein by reference.

Oxyfuel combustion produces raw flue gas containing primarily $CO_2$, together with contaminants such as water vapor; "non-condensable" gases, i.e. gases from chemical processes which are not easily condensed by cooling, such as excess combustion oxygen ($O_2$), and/or $O_2$, $N_2$ and argon (Ar) derived from any air leakage into the system; and acid gases such as $SO_3$, $SO_2$, hydrogen chloride (HCl), NO and $NO_2$ produced as oxidation products from components in the fuel or by combination of $N_2$ and $O_2$ at high temperature. The precise concentrations of the gaseous impurities present in the flue gas depend on factors such as on the fuel composition; the level of $N_2$ in the combustor; the combustion temperature; and the design of the burner and furnace.

In general, the final, purified, $CO_2$ product should ideally be produced as a high pressure fluid stream for delivery into a pipeline for transportation to storage or to site of use, e.g. in EOR. The $CO_2$ must be dry to avoid corrosion of, for example, a carbon steel pipeline. The $CO_2$ impurity levels must not jeopardize the integrity of the geological storage site, particularly if the $CO_2$ is to be used for EOR, and the transportation and storage must not infringe international and national treaties and regulations governing the transport and disposal of gas streams.

It is, therefore, necessary to purify the raw flue gas from the boiler or furnace to remove water vapor; $SO_x$; $NO_x$; soluble gaseous impurities such as HCl; and "non-condensable" gases such as $O_2$, $N_2$ and Ar, in order to produce a final $CO_2$ product which will be suitable for storage or use.

In general, the prior art in the area of $CO_2$ capture using the oxyfuel process has up to now concentrated on removal of $SO_x$ and $NO_x$ upstream of the $CO_2$ compression train in a $CO_2$ recovery and purification system, using current state of the art technology. $SO_x$ and $NO_x$ removal is based on flue gas desulphurization (FGD) schemes such as scrubbing with limestone slurry followed by air oxidation producing gypsum, and $NO_x$ reduction using a variety of techniques such as low $NO_x$ burners, over firing or using reducing agents such as ammonia or urea at elevated temperature with or without catalysts. Conventional $SO_x/NO_x$ removal using desulphurization and NO reduction technologies is disclosed in "*Oxyfuel Combustion For Coal-Fired Power Generation With $CO_2$ Capture— Opportunities And Challenges*" (Jordal et al; GHGT-7, Vancouver, 2004). Such process could be applied to conventional coal boilers.

WO 2009/010690 A and WO 2009/010691 A disclose a method for the purification of a carbon dioxide feed gas such as flue gas from an oxyfuel combustion process. The method comprises a pre-treatment step (a) to remove at least one of the impurities in the flue gas, a compression step (b) to compress the flue gas, and a carbon dioxide purification step (c) in which pure carbon dioxide liquid is produced by cooling and partial condensing the gas in a cold cycle. The method of WO 2009/010690 A is characterized by a purification step to remove $NO_x$ and/or water provided between steps (a) and (c). It is disclosed that the purification step may involve an adsorption system comprising an adsorbent bed which may be regenerated by recycling a portion of the purified gas produced in the adsorption system.

US 2009/0013871 A, US 2009/0013868 A and US 2009/0013717 A disclose a method for purifying crude carbon dioxide feed gas such as flue gas from an oxyfuel combustion system. The feed gas is pre-treated at about atmospheric pressure to remove particulates and/or $SO_x$, compressed and then pre-treated at elevated pressure to remove water and/or $NO_x$. The gas is then subjected to low temperature purification to produce liquid carbon dioxide. The high pressure pre-treatment step may involve adsorption and the gas used to regenerate the adsorption system may be recycled to the oxyfuel combustion system.

EP 0 417 922 A discloses a method for purifying carbon dioxide gas produced, for example, as a gaseous by-product from the production of ammonia or hydrogen, or from fermentation processes. Carbon dioxide feed gas is compressed and dried using a first adsorbent and the dried gas is cooled and distilled into liquid carbon dioxide bottoms and waste overhead. Carbon dioxide is recovered from the waste overhead using a second adsorbent and recycled to the compressor feed. A portion of the carbon dioxide-depleted gas from the second adsorbent is warmed and used to regenerate the first adsorbent before being vented to the atmosphere.

U.S. Pat. No. 5,614,000 A described a combined temperature swing adsorption (TSA)/pressure swing adsorption (PSA) (or "TEPSA") cycle for operating an adsorption system for removing water and carbon dioxide from air.

U.S. Pat. No. 6,511,640 A, U.S. Pat. No. 5,914,455 A, US 2003/0064014 A and U.S. Pat. No. 5,906,675 A disclose layered adsorption beds for removing impurities such as water, hydrogen ($H_2$), carbon monoxide (CO), carbon dioxide, NO and trace hydrocarbons from gas streams such as air. The beds may comprise an in-bed catalyst for converting CO to carbon dioxide. Preferred catalysts are hopcalite-type catalysts.

US 2003/164092 A discloses a process for removing $N_2O$ from a feed gas stream in which the feed gas stream is passed over an adsorbent having a nitrogen diffusion parameter 0.12 $s^{-1}$ or higher and a $N_2O$ capacity of 79 mmol/g/atm or higher at 30° C. Suitable adsorbents include CaX zeolite. The process has particular application in the pre-purification of air to remove water, carbon dioxide and $N_2O$ prior to a cryogenic air separation process.

Carbon dioxide-selective permeable membranes are known for recovering carbon dioxide from a vent gas stream. For example, EP 0 410 845 A discloses using a membrane unit to recover gas from stripper overhead vapor in a carbon dioxide liquefaction process. In addition, US 2008/0176174 A discloses using a membrane unit to recover carbon dioxide and oxygen from a non-condensable gas-rich vapor. Flue gas is generated in an oxyfuel combustion system and the vapor is produced in a low temperature process to purify the carbon dioxide from the flue gas. The recovered carbon dioxide and oxygen is recycled to the oxyfuel combustion unit.

There is a continuing need to develop new methods for removing $NO_x$ and other contaminants including water, $SO_x$ and CO, from carbon dioxide gas, and particularly from crude carbon dioxide gas such as flue gas produced in an oxyfuel combustion process such as that involved in a pulverized coal-fired power boiler.

BRIEF SUMMARY OF THE INVENTION

It is an object of the present invention to provide a method and apparatus for removing at least $NO_2$ from carbon dioxide gas comprising $NO_x$ and at least one non-condensable gas as contaminants.

It is an object of preferred embodiments of the present invention that water, if present as an additional contaminant in the carbon dioxide gas, is also removed.

It is another object of preferred embodiments of the present invention that, where present as further contaminants, NO, $N_2O$, $SO_x$ and CO are also removed.

It is a further object of preferred embodiments to control emission levels of $NO_x$, $SO_x$ and CO from oxyfuel combustion processes.

Another object of preferred embodiments is to enable capture of $NO_x$ and/or $SO_x$ that may be lost from integrated $NO_x$ and/or $SO_x$ removal systems.

A further object of preferred embodiments is to enable a more efficient design of integrated $NO_x$ and $SO_x$ removal systems.

It is a still further object of preferred embodiments to prolong the life of an oxidation catalyst within the adsorbent beds of a selective adsorbent system for removing at least $NO_2$ from the carbon dioxide gas.

According to a first aspect of the present invention, there is provided a method for removing at least $NO_2$ from a carbon dioxide feed gas comprising $NO_x$ and at least one "non-condensable" gas as contaminants, said method comprising:

passing the carbon dioxide feed gas at a first elevated pressure through a first adsorption system that selectively adsorbs at least $NO_2$ to produce at least substantially $NO_2$-free carbon dioxide gas, the first adsorption system comprising at least one adsorbent bed;

purifying the at least substantially $NO_2$-free carbon dioxide gas to produce purified carbon dioxide and carbon dioxide-lean vapor comprising at least a major portion of the non-condensable gas(es);

recovering carbon dioxide from said carbon dioxide-lean vapor at a second elevated pressure to produce carbon dioxide-rich gas and carbon dioxide-depleted gas that is rich in the non-condensable gas(es); and using at least a portion of the carbon dioxide-rich gas to regenerate at least a portion of the adsorbent bed(s) of the first adsorption system and produce $NO_2$-enriched regeneration gas.

The method removes at least $NO_2$ and, where water is present, at least substantially all of the water from the carbon dioxide gas. In addition, the adsorbent materials of the adsorbent system can be chosen and/or the adsorbent system designed such that, where present as further contaminants, NO, $N_2O$, $SO_x$ and CO are also removed. Further, adsorption of $NO_x$ and/or $SO_x$ from the carbon dioxide gas enables control of the emission levels of these contaminants. Furthermore, where the $NO_2$-enriched gas is recycled to an integrated oxyfuel combustion system, $NO_x$ may be destroyed in the boiler and, where $SO_x$ is present in the recycled stream, $SO_x$ concentration in the flue gas leaving the boiler will be increased thereby facilitating $SO_x$ removal downstream of the boiler. Also, in these embodiments, $NO_x$ and $SO_x$ removal systems may be more efficiently designed since any losses from the systems are simply recycled. In addition, where $O_2$ is present in the carbon dioxide-rich gas, and the adsorbent beds of the selective adsorption system contain an oxidation catalyst, the $O_2$ regenerates at least a portion of the catalyst, thereby prolonging the life of the catalyst.

According to a second aspect of the present invention, there is provided an apparatus for removing at least $NO_2$ from a carbon dioxide feed gas comprising $NO_x$ and at least one non-condensable gas as contaminants, the apparatus comprising:

a first adsorption system for selectively adsorbing at least $NO_2$ from the feed gas at a first elevated pressure to produce at least substantially $NO_2$-free carbon dioxide gas, the first adsorption system comprising at least one adsorbent bed;

a carbon dioxide purification system for purifying the at least substantially $NO_2$-free carbon dioxide gas to produce purified carbon dioxide and carbon dioxide-lean vapor comprising at least a major portion of the non-condensable gas(es);

a conduit arrangement for feeding at least substantially $NO_2$-free carbon dioxide gas from the first adsorption system to the carbon dioxide purification system;

a carbon dioxide recovery system for recovering carbon dioxide from the carbon dioxide-lean vapor at a second elevated pressure to produce carbon dioxide-rich gas and carbon dioxide-depleted gas that is rich in the non-condensable gas(es);

a conduit arrangement for feeding carbon dioxide-lean vapor from the carbon dioxide purification system to the carbon dioxide recovery system;

a conduit arrangement for feeding at least a portion of the carbon dioxide-rich gas to the first adsorption system to regenerate at least a portion of the adsorbent bed(s) of the first adsorption system and produce $NO_2$-enriched regeneration gas.

DETAILED DESCRIPTION OF THE INVENTION

Figure 1:
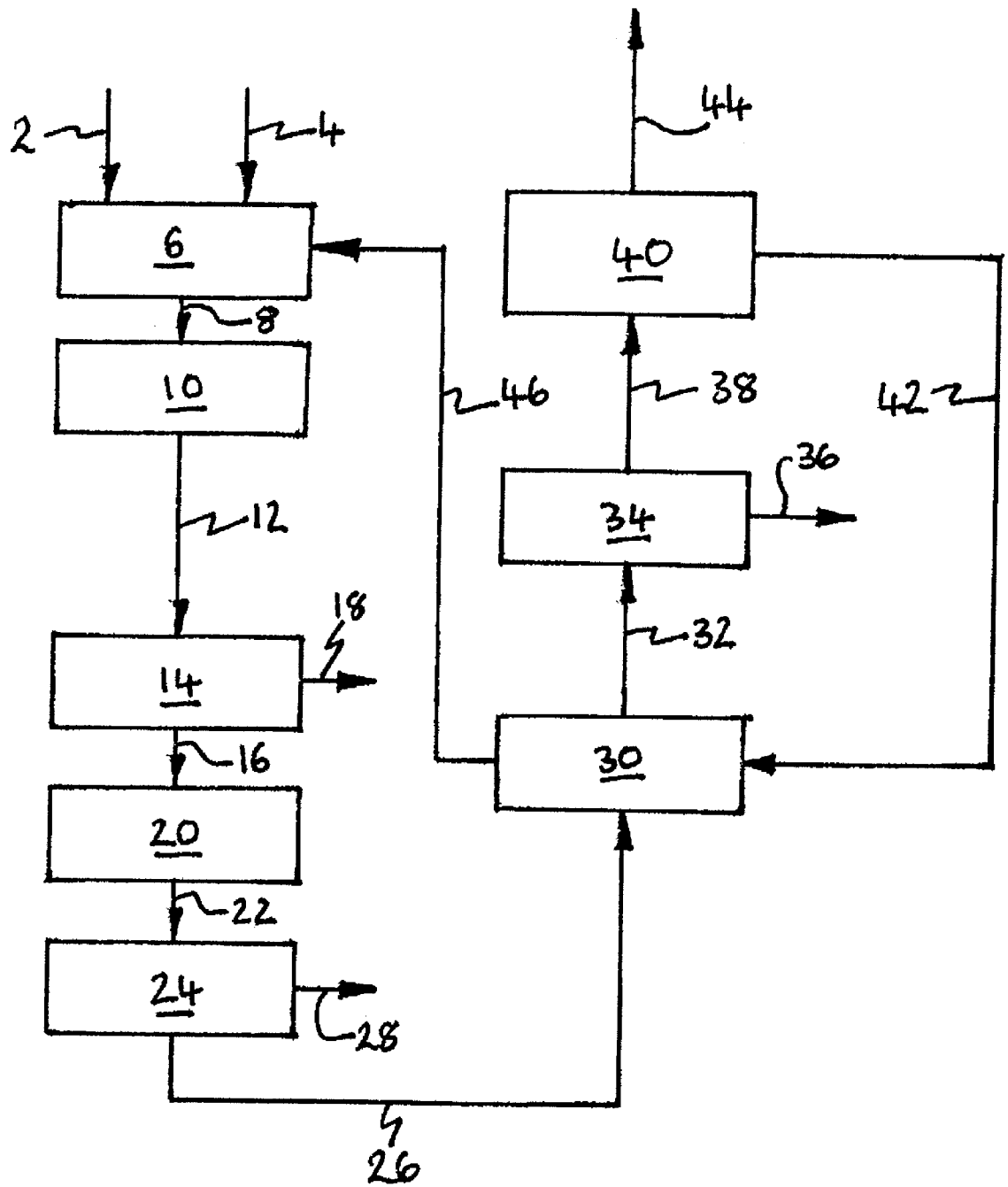
FIG. 1 is a schematic representation of one embodiment of the present invention.

The method of the present invention comprises passing the carbon dioxide feed gas at a first elevated pressure through a first adsorption system that selectively adsorbs at least $NO_2$ to produce at least substantially $NO_2$-free carbon dioxide gas, the first adsorption system comprising at least one adsorbent bed; purifying the at least substantially $NO_2$-free carbon dioxide gas to produce purified carbon dioxide and carbon dioxide-lean vapor comprising at least a major portion of the non-condensable gas(es); recovering carbon dioxide from the carbon dioxide-lean vapor at a second elevated pressure to produce carbon dioxide-rich gas and carbon dioxide-depleted gas that is rich in the non-condensable gas(es); and using at least a portion of the carbon dioxide-rich gas to regenerate at least a portion of the adsorbent bed(s) of the first adsorption system and produce $NO_2$-enriched regeneration gas.

It should be noted that the percentages indicated for the various components in gas streams discussed below are approximate molar percentages (mol. %) calculated on a dry basis. In addition, all pressures discussed throughout the specification are absolute pressures and not gauge pressures, unless otherwise stated.

The term "elevated pressure" is intended to mean a pressure that is significantly greater than atmospheric pressure. For example, the term is intended to exclude minor elevations in pressure over atmospheric pressure, such as those elevations provided by a blower or fan in order to force a gas through apparatus operating at about atmospheric pressure. Such minor pressure elevations are considered to be insignificant in the context of the present invention.

The first elevated pressure is usually at least 2 bar (0.2 MPa), e.g. at least 3 bar (0.3 MPa), preferably at least about 5 bar (0.5 MPa), and more preferably at least about 10 bar (1 MPa). The first elevated pressure is usually no more than about 100 bar (10 MPa) and preferably no more than 50 bar (5 MPa). In preferred embodiments, the first elevated pressure is from 3 bar to about 50 bar (0.3 MPa to 5 MPa), e.g. from about 5 bar to about 50 bar (0.5 MPa to 5 MPa) or from about 20 bar to 50 bar (2 MPa to 5 MPa). The first elevated pressure may be about 30 bar (3 MPa).

The method is suitable to purify carbon dioxide feed gas comprising $NO_x$ and at least one non-condensable gas as contaminants from any source. The method has particular application in removing at least $NO_2$ from "impure" carbon dioxide feed gas, e.g. carbon dioxide gas having from about 90 mol % to about 95 mol. % carbon dioxide, and more particularly in removing $NO_2$ from "crude" carbon dioxide gas, e.g. carbon dioxide feed gas having from about 40 mol. % to about 90 mol. % carbon dioxide. In preferred embodiments, the carbon dioxide feed gas has from about 60 mol % to about 90 mol % carbon dioxide; preferably, from about 65 mol % to about 85 mol % carbon dioxide.

In preferred embodiments, the carbon dioxide feed gas is, or is derived from, flue gas produced by oxyfuel combustion of a fuel usually selected from the group consisting of hydrocarbons, carbonaceous fuels, and biomass, in an $O_2$-rich gas. Suitable hydrocarbon fuels include natural gas; and $C_1$ to $C_6$ hydrocarbons such as methane and ethane. Suitable carbonaceous fuels include coal such as lignite, sub-bituminous coal, bituminous coal and anthracite. The invention has particular application where the fuel is a sulfur-containing carbonaceous fuel such as pulverized coal.

The $O_2$-rich gas is a gas having a higher concentration of $O_2$ than air, e.g. more than about 21% $O_2$, and preferably at least 80% $O_2$. The use of pure $O_2$, e.g. at least 95% $O_2$ is preferred. The presence of such high quantities of $O_2$ raises the combustion temperature, potentially to excessive levels. Thus, flue gas produced from the combustion process is typically recycled to the oxyfuel combustion system to moderate the temperature of combustion and control heat flux. Typically, a significant portion of the flue gas, e.g. from about 60% to about 80%, is recycled in this way. Thus, the flue gas to be treated by the present method is usually from about 20% to about 40% of the total flue gas leaving in the oxyfuel combustion system. Such flue gas is a crude carbon dioxide gas typically having from about 40 mol % to about 90 mol % carbon dioxide.

The invention has particular application in treating large volumes of flue gas generated in industrial combustion processes such as in combustion processes involved in boilers for power generation. The flow rate of the flue gas to be treated by the present invention is typically from about 200 kmol/h to about 40,000 kmol/h.

$NO_x$ is usually present in the carbon dioxide feed gas an amount from 100 ppm to 10,000 ppm, and is typically from about 500 ppm to about 3,000 ppm. The majority of the $NO_x$ is usually NO with $NO_2$ being the second most abundant component of $NO_x$. The $NO_x$ may include other oxides of nitrogen such as $N_2O$, $N_2O_4$ and $N_2O_3$, but these oxides are usually in smaller quantities than $NO_2$. However, it is possible that a substantial portion, e.g. up to 50%, of the $NO_x$ in the carbon dioxide feed gas is $N_2O$, with the remainder typically being primarily $NO_2$ and NO. Where the feed gas is, or is derived from, flue gas from an oxyfuel combustion process, the $NO_x$ is produced by reaction of $N_2$ and/or nitrogen-containing compounds in the fuel, with $O_2$ in the combustion system.

The feed gas comprises at least one "non-condensable" gas, i.e. a gas from a chemical process which is not easily condensed by cooling. The non-condensable gases are usually selected from the group consisting of $O_2$; $N_2$; Ar; rare gases such as krypton (Kr) and xenon (Xe); and mixtures thereof. Typically, all of these gases are present in the feed gas. Where the feed gas is, or is derived from, flue gas generated in an oxyfuel combustion process, $O_2$ is typically present in the feed gas from excess $O_2$ used in the combustion process, and from air ingress into the combustion system which is also responsible for the presence of $N_2$, Ar, Kr and Xe in the gas.

The feed gas usually contains at least sufficient $O_2$ required for all of the relevant oxidation reactions discussed herein, and usually contains an excess of $O_2$. In this connection, $O_2$ is typically present in an amount from about 0.1% to about 15%, e.g. from about 1% to about 8%, of the feed gas. Since the rate of oxidation generally increases with oxygen concentration, the feed gas preferably contains at least 1% $O_2$, more preferably at least 3% $O_2$, and most preferably at least 5% $O_2$. Where there is insufficient $O_2$ in the feed gas (or no $O_2$ at all), $O_2$ may be added to the feed gas from an external source.

Where present in the feed gas, $N_2$ is typically present in an amount from about 5% to about 30% of the feed gas; Ar is typically present in an amount from about 0.1% to about 10% of the feed gas; Kr is typically present in an amount from about 0.5 ppm to about 1.5 ppm; and Xe is typically present in an amount from about 30 ppb to about 150 ppb.

Water is also usually present in the feed gas, usually in an amount of no more than 2%, e.g. no more than 1% or no more than 5,000 ppm, of the feed gas. Where the feed gas is, or is derived from, flue gas, the amount of water in the flue gas depends on a number of factors including not only on the composition of the fuel and combustion conditions, but also whether and, if so, the extent to which, the flue gas is cooled by washing in water prior to compression. In this case, the amount of water present will depend on the saturated vapor pressure at the conditions to the inlet of the compression system. As a general guide, the amount of water is usually from about 0.1% to about 30% of the flue gas. For example, at about 1 bar (0.1 MPa), a 10° C. feed to the compressor provides about 1.2% water, a 20° C. to 40° C. feed would give from about 2% to 8% water, and a 60° C. feed would give about 20% water. Most of the water in the flue gas would be removed before or during the compression process to compress the flue gas to the first elevated pressure. The concentration of water in the flue gas after compression depends on its vapor pressure in the carbon dioxide at the temperature of the flue gas stream and the total flue gas pressure. However, for the preferred operating temperatures and pressures of the present invention, sufficient water is likely to be present to freeze up in a low temperature carbon dioxide purification process.

Where present, the amount of $SO_2$ contaminant in the carbon dioxide feed gas is usually more than 50 ppm but no more than about 10,000 ppm, and is typically from about 100 ppm to about 5,000 ppm. Where the feed gas is, or is derived from, flue gas from an oxyfuel combustion process, $SO_x$ is produced by the combustion of elemental sulfur and/or sulfur-containing compounds present in the fuel.

Where present, the amount of CO contaminant in the carbon dioxide feed gas is usually more than about 50 ppm but no more than about 10,000 ppm, and is typically from about 100 ppm to about 5,000 ppm. Where the feed gas is, or is derived from, flue gas from an oxyfuel combustion process, CO is present as a result of incomplete combustion of the fuel.

In addition to $NO_x$, the non-condensable gas(es), water, $SO_x$ and CO, flue gas from an oxyfuel combustion process usually comprises further contaminants including solid particulates such as fly ash and soot; hydrogen chloride (HCl); hydrogen fluoride (HF); carbon disulfide ($CS_2$); hydrogen disulfide ($H_2S$); hydrogen cyanide (HCN); volatile organic compounds (VOCs) such as $CHCl_3$; metals including mercury, arsenic, iron, nickel, tin, lead, cadmium, vanadium, molybdenum and selenium; and compounds of these metals. A further advantage of preferred embodiments of the present invention is that an oxidation catalyst present in the adsorbent bed(s) may also be useful in the oxidation of other species present in the flue gas such as mercury, HCN, arsine ($ArH_3$), and other impurities.

In embodiments where the carbon dioxide feed gas is, or is derived from, flue gas generated in an oxyfuel combustion unit, the flue gas from the combustion unit is typically pre-treated by washing with water to remove solid particulates (such as soot and/or fly ash) and water soluble components (such as HF, HCl and/or $SO_3$). Additionally, the flue gas may be filtered, using equipment such as a baghouse or electrostatic precipitator, to enhance particulate removal.

It may be desirable to remove $SO_2$ from the flue gas prior to the first adsorption system in the present method. In some embodiments, $SO_2$ is removed in a conventional flue gas desulfurization unit by reaction at about atmospheric pressure with an alkaline sorbent material such as limestone in the form of an aqueous slurry. In other embodiments, $SO_2$ is converted to aqueous sulfuric acid condensate by oxidizing $SO_2$ in the presence of $O_2$ over a solid $SO_2$-oxidation catalyst at an elevated pressure to produce $SO_3$ and then by reacting the $SO_3$ with water. In further embodiments, $SO_2$ is converted to sulfuric acid condensate by maintaining the flue gas at elevated pressure in the presence of $NO_x$, $O_2$ and water for a period of time sufficient to convert $SO_2$ to sulfuric acid condensate.

It may also be desirable to remove a portion of the $NO_x$ in the flue gas prior to purification of the carbon dioxide feed gas in the present method. A portion of $NO_x$ in the flue gas may be converted to $N_2$ in a conventional SCR process, or may converted to nitric acid condensate by maintaining the flue gas at elevated pressure in the presence of $O_2$ and water.

These embodiments have the advantage that the first adsorption system only needs to remove the remaining $NO_2$ (and, perhaps, other impurities such as $SO_2$) and may be optimized with regard to these upstream processes. In this way, the design margins of the upstream $SO2/NO_x$ removal systems may be relaxed and slippage of $SO_x$ and $NO_x$ allowed as these components will be captured by the first adsorption system.

In a preferred embodiment, flue gas comprising $SO_2$ and $NO_x$ is maintained at elevated pressure(s) in the presence of $O_2$ and water for a period of time sufficient to convert the $SO_2$ to sulfuric acid condensate and a portion of the $NO_x$ to nitric acid condensate, thereby providing $SO_2$-depleted, $NO_x$-lean carbon dioxide gas which, after separation of the acid condensates, may be used as the feed gas for the present method.

Sulfuric acid (and nitric acid) is formed according to the following series of reactions which are referred to herein as "sour compression" or "sour gas" reactions:

$2NO+O_2 \leftrightarrow 2NO_2$ (i)

$2NO_2+H_2O \leftrightarrow HNO_2+HNO_3$ (ii)

$3HNO_2 \leftrightarrow HNO_3+2NO+H_2O$ (iii)

$NO_2+SO_2 \leftrightarrow NO+SO_3$ (iv)

$SO_3+H_2O \rightarrow H_2SO_4$ (v)

Following extensive studies (Counce, R. M. (1977), "*A literature review of nitrogen oxide absorption into water and dilute nitric acid*", Technical Report ORNL/TM-5921, Oak Ridge National Laboratory), it has been determined that the rate of reaction (i) is increased as the reaction pressure increases. The Inventors realized that carrying out the present method at elevated pressure improves the rate of reaction (i).

$SO_2/NO_x$ may be removed using the sour compression reactions at a single elevated pressure, e.g. within the above mentioned preferred ranges for the first elevated pressure, and preferably at about the same elevated pressure as the first elevated pressure of the first adsorption system (subject to any inherent pressure loss in the apparatus used to carry out the method), or at more than one elevated pressure. For example, substantially all of the $SO_2$ and some of the $NO_x$ may be removed by the sour compression reactions (i) to (v) at an initial elevated pressure from at least about 3 bar (0.1 MPa) to less than the first elevated pressure, e.g. about 10 bar to about 20 bar (1 to 2 MPa). The gas may then be further compressed and some of the remaining $NO_x$ may be removed by the sour compression reactions (i) to (ii) at about the first elevated pressure, e.g. at about 30 bar (3 MPa).

The temperature at which the sour compression reactions take place in a sour gas reactor system may be from ambient temperature to below the acid dew point. For example, the temperature may be from about 20° C. to about 150° C., e.g. from about 25° C. to about 100° C., or from about 30° C. to about 50° C.

The or each sour gas reactor system simply provides a sufficient volume for a given flow rate within which the reactions may take place at elevated pressure(s). A sour gas reactor system usually comprises a pressurizable reactor vessel such as a pipe or duct; a tank; an absorption column; a wet scrubbing tower; fluidized or moving bed; packed tower or column; and a Venturi scrubber. Where a sour gas reactor system comprises a countercurrent gas/liquid contact column, acid condensate may be removed from the bottom of the column, pumped, cooled and fed as reflux to the top of the column.

Residence time in a sour gas reactor system (i.e. contact time or "hold up" time) determines the degree or extent of the sour compression reactions. In this connection, the period of time required for converting $NO_x$ to nitric acid is typically longer than that required for converting $SO_2$ to sulfuric acid. This period of time is usually no more than 1000 s, and preferably no more than 600 s. This period of time is usually more than 5 s, e.g. more than 10 s or more than 20 s. The period of time may be from 5 s to about 600 s, e.g. from about 10 s to about 500 s or from about 15 s to about 200 s. It should be noted that, whilst the sour compression reactions begin as soon as the pressure and temperature conditions allow, the reactions typically progress to a significant extent only after about 5 s, and usually only after about 10 s or even 20 s.

Further details of the sour compression reactions themselves and of methods incorporating the reactions to remove $SO_x$ and/or $NO_x$ from flue gas, are provided in US 2007/0122328 A1, the disclosure of which is incorporated herein by reference.

If the flue gas is at atmospheric pressure after any such pre-treatment, then it is compressed to the first elevated pressure to form the carbon dioxide feed gas to be purified by the method. However, if the feed gas originates from a source, such as a pressurized oxyfuel combustion system or a pressurized pre-treatment step that is already at the required first elevated pressure, then further compression may not be required.

Feed gas may be compressed in a single stage or in more than one stages, with or without interstage cooling using heat exchangers. If interstage cooling is used, then means (e.g. "knockout" pots) may be provided to capture and remove any condensate that is formed during the compression step.

The carbon dioxide feed gas is usually fed to the first adsorption system at a first temperature from about 10° C. to about 60° C. In this connection, the temperature of the feed gas after compression may range from ambient to about 500° C. If the gas is compressed in multiple stages, then the extent to which the gas is intercooled may be calculated and carefully controlled so as to provide the feed gas not only at the first elevated pressure but also at the desired adsorption temperature so that any additional post-compression heating or cooling of the gas is minimized or even eliminated entirely. Alternatively, the temperature of the feed gas may be adjusted as required after compression. For example, the gas may be cooled to the desired adsorption temperature by indirect heat exchange with a coolant, e.g. cooling water, or the gas may be heated to the desired adsorption temperature by indirect heat exchange with a heat transfer fluid, e.g. steam.

The first adsorption system is typically downstream of the carbon dioxide compression train. In such embodiments, there is no further compression of the gas prior to the carbon dioxide purification step or the carbon dioxide recovery step and the second elevated pressure is the same as the first elevated pressure subject to any inherent pressure drop in the apparatus. However, the first adsorption system may be located at an intermediate stage of the compression train. In such embodiments, the gas is compressed to the second elevated pressure after the first adsorption step.

The first adsorbent system comprises at least one adsorbent bed. The or each bed comprises at least one layer of adsorbent material for selectively adsorbing at least $NO_2$ from the feed gas. Suitable $NO_2$-adsorbent materials include alumina, silica gel, zeolites, and (supported or unsupported) metal oxides such as $Fe_2O_3$, CuO and MnO and mixtures thereof such as hopcalite-type (CuO/MnO) materials. Such adsorbent materials also adsorb higher oxides of nitrogen. $Fe_2O_3$ reacts with $NO_2$ in the presence of $O_2$ at ambient conditions to form $Fe(NO_3)_3$ which can be converted back to the corresponding oxide by thermal regeneration at temperatures of about 200° C. CuO and MnO exhibit similar chemistries in this regard.

The first adsorption system produces at least substantially $NO_2$-free carbon dioxide gas. By "substantially $NO_2$-free", the Inventors mean that the concentration of $NO_2$ in the carbon dioxide gas has been reduced to less than 100 ppm, and that the adsorption system typically reduces $NO_x$ concentration by at least 75%. It is particularly important for the carbon dioxide gas to be at least substantially free of $NO_2$ in embodiments where the carbon dioxide gas is purified at low temperature, e.g. below 0° C., to produce liquid carbon dioxide to avoid any significant quantity of $NO_2$ freezing out of the gas during purification.

The at least substantially $NO_2$-free carbon dioxide gas is typically purified at low temperature, e.g. below 0° C., to produce purified carbon dioxide as a liquid. The carbon dioxide may be purified by cooling the gas and then distilling the cooled gas in a distillation column system to produce carbon dioxide liquid bottoms and carbon dioxide-lean overhead vapor comprising at least a major portion of the non-condensable gases. However, in preferred embodiments, the carbon dioxide is purified by cooling the gas to condense carbon dioxide in the gas and produce carbon dioxide liquid and a first carbon dioxide-lean vapor comprising the majority of the non-condensable gases (e.g. $N_2$, Ar and $O_2$) and then separating these phases in a first phase separation system. The first carbon dioxide-lean vapor may be further cooled to condense additional carbon dioxide and produce a second carbon dioxide-lean vapor comprising the non-condensable gases. The additional liquid carbon dioxide may be separated from the second carbon-dioxide-lean vapor in a second phase separation system. The carbon dioxide liquid and the additional carbon dioxide may be combined a liquid carbon dioxide product.

The purity of the carbon dioxide liquid produced by the low temperature carbon dioxide purification process is usually at least 90%, typically at least 95%, and preferably at least 99%.

The "major portion" of the non-condensable gas(es) is at least 50%, usually at least 60%, and preferably at least 70% of the total non-condensable gas(es) in the feed gas. For high purity liquid carbon dioxide product (e.g. at least 98% carbon dioxide), the major portion is usually at least 90%, typically at least 95%, and preferably at least 99% of the non-condensable gas(es) from the feed gas. At lower levels of carbon dioxide enrichment (e.g. wherein the at least substantially $NO_2$-free carbon dioxide gas comprises 85% carbon dioxide and produces a low purity liquid carbon dioxide such as 95%), the major portion is usually at least 70%, typically at least 80%, and preferably at least 85%.

Carbon dioxide is recovered from the carbon dioxide-lean vapor in at least one pressure driven process at a second elevated pressure in order to avoid wasting the pressure energy in the carbon dioxide-lean vapor, for example by expanding the carbon dioxide-lean vapor over a valve. In addition, the total recovery of carbon dioxide from the process is improved.

The second elevated pressure is usually at least 2 bar (0.2 MPa), e.g. at least 3 bar (0.3 MPa), preferably at least about 5 bar (0.5 MPa), and more preferably at least about 10 bar (1 MPa). The second elevated pressure is usually no more than about 100 bar (10 MPa), and preferably no more than about 50 bar (5 MPa). In preferred embodiments, the second elevated pressure is from 3 bar to about 50 bar (0.3 MPa to 5 MPa), e.g. from about 5 bar to about 50 bar (0.5 MPa to 5 MPa), or from about 20 bar to 50 bar (2 MPa to 5 MPa). The second elevated pressure may be about 30 bar (3 MPa). The second elevated pressure is preferably the same as the first elevated pressure. In reality, the second elevated pressure may be slightly less than the first elevated pressure due to any inherent pressure drop in the apparatus used to carry out the method.

In some embodiments, carbon dioxide is recovered from the carbon dioxide-lean vapor at the second elevated pressure by permeation across a carbon dioxide-selective permeable membrane to produce the carbon dioxide-rich gas as a permeate fraction and the carbon dioxide-depleted gas as a retentate fraction.

In embodiments in which the carbon dioxide feed gas comprises $O_2$ as a further contaminant, a portion of said $O_2$ is preferably recovered with carbon dioxide such that the carbon dioxide-rich gas comprises $O_2$ and therefore the $NO_2$-enriched regeneration gas also comprises $O_2$. An advantage of having $O_2$ in the gas used to regenerate the adsorbent bed(s) of the selective adsorption system is that an oxidation catalyst present within the bed(s) may be regenerated thereby extending the life of the catalyst.

An example of a process for recovering carbon dioxide from a carbon dioxide-lean vapor derived from flue gas generated in an oxyfuel combustion process, using a membrane separation system, is disclosed in US 2008/0176174 A, the disclosure of which is incorporated herein by reference.

Standard carbon dioxide-selective polymeric membranes can be used. Since carbon dioxide and $O_2$ have higher solubility and diffusivity than non-condensable gases such as $N_2$ and Ar in most separation polymers, the carbon dioxide and, where present, $O_2$ will selectively permeate through the membrane producing a stream enriched in carbon dioxide (and $O_2$) at low pressure, e.g. at or near to atmospheric pressure.

In other embodiments, carbon dioxide is recovered from the carbon dioxide-lean vapor at the second elevated pressure by selective adsorption using a second adsorption system comprising at least one adsorbent bed that selectively adsorbs carbon dioxide to produce the carbon dioxide-depleted gas. The carbon dioxide-rich gas is produced on regeneration of the bed(s) of the second adsorption system.

If carbon dioxide is recovered using a PSA system, the adsorbents employed are size-selective adsorbents like carbon molecular sieves or small pore inorganic adsorbents like zeolites or titanosilicates. Since carbon dioxide (and $O_2$) has a smaller molecular diameter than the non-condensable gases, $N_2$ and Ar, it will be selectively adsorbed on the small pore adsorbents producing a high pressure effluent stream, enriched in non-condensable gas(es) such as $N_2$ and Ar. The low pressure (at or near atmospheric pressure) regeneration effluent will be enriched in carbon dioxide and, if present in the carbon dioxide-lean vapor, $O_2$, and it is this low pressure gas that would be used to regenerate the dryer.

Carbon dioxide may be recovered from the carbon dioxide-lean vapor in one or more steps using membrane separation, selective adsorption or a combination of the two processes.

Where the carbon dioxide feed gas is, or is derived from, flue gas generated in an oxyfuel combustion system, the method preferably comprises recycling at least a portion of the $NO_2$-enriched regeneration gas to the oxyfuel combustion system. $NO_x$ returned to the combustion system in this way will be destroyed by the combustion process thereby reducing $NO_x$ emissions. If $O_2$ is present in the $NO_2$-enriched regeneration gas, then recycling $O_2$ in this way reduces the demand for "new" $O_2$ in the oxyfuel combustion process thereby potentially reducing the size of a front-end oxygen generation system such as a cryogenic air separation unit (ASU).

Advantageously, the carbon dioxide recovery system also recovers as much $O_2$ as possible without excessive recovery of other non-condensable gases, e.g. $N_2$ and Ar. In other words, the carbon dioxide recovery system should be more selective for $O_2$ than for the other non-condensable components. Thus, the carbon dioxide-lean vapor has a first $O_2$ concentration and the carbon dioxide-rich gas has a second $O_2$ concentration. In preferred embodiments, the second $O_2$ concentration is greater than the first $O_2$ concentration.

Where the carbon dioxide/$O_2$-rich gas is recycled to an oxyfuel combustion system, not all of the gas may be required for regeneration and thus a portion may be sent directly to the oxyfuel combustion system. In addition, the gas that is recycled to the combustion system may be sent directly to the boiler or burners. However, instead of supplying the boiler or burners directly, the gas may be used to dilute the $O_2$ feed to the oxyfuel combustion system. This would be an advantage if the carbon dioxide separation system and ASU are close by, so that a single piping run to the boiler could be used. Alternatively, the carbon dioxide/$O_2$-rich gas could be added to a flue gas recycle stream. In some embodiments, a combination of at least two of these recycle locations may be used.

The $NO_2$-enriched regeneration gas may be recycled to the feed to the compressor system or, preferably, to the oxyfuel combustion system. Where the method comprises recycling the $NO_2$-enriched regeneration gas to the oxyfuel combustion system, the method may comprise cooling the regeneration gas to produce aqueous acid condensate and removing said aqueous acid condensate prior to recycling said gas. In this way, water and acid(s) are "knocked out" of the gas before the gas is recycled back to the combustion unit. In other embodiments, the method may comprise heating the regeneration gas to prevent production of aqueous condensate prior to recycling said gas. In this way, formation of acids in the wet gas stream before recycling back to the oxyfuel combustion system is avoided. Alternatively, the regeneration gas may be cooled to knock out some of the water and acid(s), before being heated to prevent further acid/water condensing out of the gas before it is recycled to the combustion system.

The carbon dioxide feed gas has a first flow rate and the portion of the carbon dioxide-rich gas used to regenerate the adsorbent bed(s) has a second flow rate. In preferred embodiments, the second flow rate is from about 5% to about 25% of the first flow rate.

In some embodiments, the first adsorption system may also adsorb NO from the feed gas such that the at least substantially $NO_2$-free carbon dioxide gas is at least substantially $NO_x$-free, and the $NO_2$-enriched regeneration gas comprises NO. By "substantially $NO_x$ free", the Inventors mean that the adsorption system reduces $NO_x$ concentration by at least 75% and that the $NO_x$ concentration is typically reduced to no more than 100 ppm. In such embodiments, the first adsorbent system comprises at least one layer of a reversible $NO_x$ adsorbent material such as alumina, silica gel, zeolites and (supported or unsupported) metal oxides including $Fe_2O_3$, CuO and MnO. Preferred NO adsorbents include zeolites with Si/Al ratios greater than 25. Lower Si/Al zeolites have a tendency to disproportionate NO. Zeolites with low cation content will adsorb NO without this disproportionation.

In the event that the adsorbent does not remove all the NO in the feed stream, NO will usually concentrate in the low pressure stream generated in the carbon dioxide recovery step since NO has a smaller molecular diameter than $N_2$ and Ar and, thus, will either diffuse more quickly through a polymer membrane than $N_2$ or Ar, or will be selectively adsorbed by small pore adsorbents. In this case, the carbon dioxide-rich gas for use as the regenerating gas for the adsorbent will usually be rich in NO.

In other embodiments, the first adsorption system may comprises a NO-oxidation catalyst to oxidize NO in the presence of $O_2$ to produce $NO_2$ which is adsorbed by the first adsorption system, and desorbed on regeneration of the adsorbent bed(s) such that the $NO_2$-enriched regeneration gas comprises additional $NO_2$. The at least substantially $NO_2$-free carbon dioxide gas is at least substantially $NO_x$-free.

$NO_2$ is more strongly adsorbed than NO, so conversion to the higher oxide results in greater $NO_x$ capacity. Typical catalysts included mixed transition metal oxides including CuO/MnO (hopcalite) type materials. In a layered bed system, the first adsorbent system may contain at least one desiccant layer, followed by at least one layer containing an oxidation catalyst, then at least one adsorbent layer for removing $NO_2$ and any other higher nitrogen oxides formed. The final layer(s) may be the same as the catalyst layer(s) since the first stage of heterogeneous catalyst is chemisorption of the gas on to the surface of the solid catalyst and so these materials also act as re-generable adsorbent materials.

For NO (and CO) oxidation catalysts to function, the gas stream treated must be dry and $SO_x$-free. In the presence of $SO_x$ and oxygen, the metal oxides irreversibly form sulfates. There is also potential for the catalyst to deactivate slowly in the $CO_2$ stream by the formation of metal carbonates (e.g. $MnO+CO_2 \rightarrow MnCO_3$). Since the catalyst is placed in a dryer bed, it is typically periodically thermally regenerated. Such thermal regeneration will convert any unwanted carbonate to the active metal oxide. The catalysts may also slowly deactivate by reaction with $NO_2$ to form nitrates, but thermal regeneration of nitrates at temperatures of about 200° C. will covert the nitrates back to oxides. The presence of $O_2$ in the gas to regenerate the bed(s) also ensures that the catalyst is in the oxidized, i.e. active, form.

The first adsorption system may comprise a NO-reduction catalyst to reduce NO in the presence of a reducing gas to produce $N_2$. In such embodiments, the at least substantially $NO_2$-free carbon dioxide gas is enriched with $N_2$. Suitable reducing gases include CO (which should be present in feed gas derived from oxyfuel flue gas), methane or ammonia. Suitable catalysts include transition metal-based catalysts and noble metal-based catalysts, and examples of suitable catalysts include vanadium oxide and tungsten oxide catalysts.

The carbon dioxide feed gas may contain $N_2O$ as a further contaminant. In such embodiments, the first adsorption system may absorb $N_2O$ from the feed gas to ensure that at least 75% of $NO_x$ from the feed gas is removed by the adsorption system and that the concentration of $NO_x$ in the gas is typically reduced to no more than 100 ppm.

Where $N_2O$ is to be removed, the adsorbent bed(s) of the adsorbent system preferably comprises one or more layers of a $N_2O$-selective adsorbent material. Suitable materials include calcium-exchanged zeolite or magnesium-exchanged zeolite and include the adsorbents disclosed in US 2003/0164092 A, the disclosure of which is incorporated herein by reference. Suitable examples of such materials include CaX and 5A. The level of exchange is preferably from about 50% to 100%, e.g. about 80%, i.e. the majority of cations in the zeolite should be calcium cations or magnesium cations versus sodium cations in a standard 13X material for example.

The carbon dioxide feed gas usually comprises water as a further contaminant, particularly if the feed gas is, or is derived from, flue gas generated by oxyfuel combustion. In such embodiments, the first adsorption system adsorbs water from the feed gas such that the at least substantially $NO_2$-free carbon dioxide gas is at least substantially dry, and the $NO_2$-enriched regeneration gas is wet. By "substantially dry", the Inventors mean that the gas is substantially water-free, typically containing no more than 10 ppm water.

Where water is to be removed from the feed gas, the adsorbent bed(s) of the first adsorbent system may comprise one or more layers of adsorbent material that simultaneously removes water and $NO_x$. However, in preferred embodiments, the adsorbent bed(s) comprising an inlet end and an outlet end, comprise one or more layers at the inlet end to remove water, and then one or more additional layers downstream of the inlet end to remove $NO_x$. In such embodiments, the sizing of adsorbent bed(s) is such that, towards the end of the feed step, the water front progresses onto the $NO_x$ adsorbent layer(s). This displaces $NO_x$ from the adsorbent, increasing its concentration in the gas phase. The $NO_x$ is then readsorbed on the bed further downstream. The total adsorbent quantity of adsorbent material required is thereby potentially reduced as $NO_x$ is adsorbed at greater partial pressure (hence a higher adsorbent capacity). In addition, the concentration of $NO_x$ on the adsorbent material may also be increased which may help some of the regeneration techniques that could be used.

Adsorbent materials suitable for adsorbing water, e.g. desiccant materials, in the first adsorbent system include alumina, silica gel, porous glass, zeolites and activated carbon. Preferably, the inlet end adsorbent should have a water heat of adsorption of less than 15 kcal/gmol at a water loading of 10 wt %. Such preferred adsorbents include activated alumina, silica gel and activated carbon.

The carbon dioxide feed gas may also comprise $SO_x$ as a further contaminant, particularly if the feed gas is, or is derived from, flue gas generated by oxyfuel combustion of a carbonaceous fuel and in the event that an upstream desulfurization step allows some $SO_x$ slippage. In such embodiments, the first adsorption system preferably adsorbs $SO_x$ from the feed gas such that said at least substantially $NO_2$-free carbon dioxide gas is at least substantially $SO_x$-free, and the $NO_2$-enriched regeneration gas comprises $SO_x$. By "substantially $SO_x$-free", the Inventors mean that the gas typically has no more than 1 ppm $SO_x$. Preferred desiccants also have significant capacity for $SO_2$. Thus, where the feed gas comprises $SO_2$ as a further contaminant, a desiccant section can be designed to remove both water and $SO_2$. Suitable $SO_2$ adsorbent materials include the adsorbent materials for removing $NO_x$, e.g. alumina, silica gel and zeolites.

If $SO_x$ is removed from the feed gas, together with $NO_x$ and recycled back to the oxyfuel combustion system, then substantially all of the recycled $SO_x$ will be removed from the process in the pre-treatment step to desulfurize the flue gas prior to application of the present method.

The carbon dioxide feed gas typically comprises CO as a further contaminant. In such embodiments, the first adsorption system adsorbs CO from the feed gas such that the at least substantially $NO_2$-free carbon dioxide gas is at least substantially CO-free. By "substantially CO-free", the Inventors mean that at least 75% of CO in the feed gas is removed by the first adsorption system, either by adsorption alone, or by adsorption and subsequent oxidation to carbon dioxide. If no CO-catalyst is present in the first adsorption system, some CO may travel through to the $NO_2$-enriched gas although normally at least the majority of the CO would reside in the carbon dioxide-depleted gas and would be vented.

The first adsorption system may comprise a CO-oxidation catalyst to oxidize CO in the presence of $O_2$ to produce carbon dioxide such that the at least substantially $NO_2$-free carbon dioxide gas comprises additional carbon dioxide. Catalysts suitable for oxidizing NO to $NO_2$ are typically also suitable to oxidize CO to carbon dioxide.

The first adsorption system may be regenerated using a PSA cycle, a TSA cycle, a vacuum swing adsorption cycle (VSA), or a combination of at least two of these cycles, e.g. a TEPSA cycle such as that disclosed in U.S. Pat. No. 5,614,000, the disclosure of which is incorporated herein by reference.

The first adsorption system may be regenerated at any suitable pressure although it is typically regenerated at about atmospheric pressure. The $NO_2$-enriched regeneration gas is usually at a pressure sufficient for recycling at least part of the gas to the oxyfuel combustion system without additional compression. The temperature of the $NO_2$-enriched regeneration gas will vary over the course of the regeneration cycle. For a PSA cycle, the maximum gas temperature of the $NO_2$-enriched regeneration gas is usually about 60° C. However, for a TSA cycle, this temperature could peak at about 200° C.

In some embodiments, the carbon dioxide-rich gas is used to regenerate all the adsorbent bed(s) of the first adsorption system. However, in other embodiments, the carbon dioxide-rich gas is used to regenerate a portion of the adsorbent bed(s) of the first adsorption system and the remaining portion of the bed(s) is regenerated using at least one other regenerating gas. In these other embodiments, the carbon dioxide-rich gas may be used to desorb $NO_x$ and other (non-water) compounds from the adsorbent bed(s) and the $NO_2$-enriched regeneration gas may be recycled to an oxyfuel combustion unit. After sufficient $NO_2$, etc. has been desorbed, the carbon dioxide-rich gas may be sent directly to the oxyfuel combustion unit and other regenerating gas(es) may be used to desorb the rest of the $NO_x$ and, if present, water. Other suitable regenerating gases include the carbon dioxide-depleted gas that is rich in the non-condensable gas(es) and carbon dioxide/water-free air from an ASU or waste gas from an ASU.

A second regenerating gas will generally be available in larger quantities than the carbon dioxide-rich gas. Having more of a second regenerating gas has certain advantages. For example, in TSA regeneration, switching to the second gas will allow the heat pulse to be pushed through the bed faster, reducing the required time for regeneration. In turn, this means that the cycle time can be reduced, decreasing the amount of adsorbent required. For PSA/VSA regeneration, higher flow rates mean that greater amounts of water will be removed, increasing the dynamic capacity of the adsorbent materials and also reducing the amount of adsorbent required.

A further advantage may be observed if different adsorbents are used for water and $NO_x/SO_x$ removal and thermal regeneration is used. The heat pulse used for thermal regeneration will pass through the $NO_x/SO_x$ adsorbent before the desiccant and, hence, $NO_x/SO_x$ will be driven off the adsorbent bed before water. If the carbon dioxide-rich gas comprising $O_2$ is used as the regenerating gas at this time, then these components can be collected and recycled to the boiler. It may be sufficient to provide just enough heat to regenerate the $NO_x/SO_x$ adsorbent by thermal regeneration. The desiccant is then simply regenerated using PSA (i.e. cool gas flow). After the regenerating gas is switched from the carbon dioxide-rich gas comprising $O_2$ to a second regenerating gas, then there may be an initial period during which the gas is still sent to the boiler rather than vent in order to allow the first adsorption system to be "rinsed" out and the residual carbon dioxide/$O_2$ inside the vessel to be retained within the system.

The first adsorption system usually comprises at least two adsorption beds in parallel so that at least one bed may be in an adsorption phase while the remaining bed(s) is/are being regenerated. Each adsorption bed is in a pressurizable vessel. The pressurizable vessel for each adsorption bed may be in gas flow communication with at least one gas storage vessel in a system for saving pressure energy.

Under normal operation of an adsorption system having two beds, one vessel is on feed at elevated pressure and one vessel is being regenerated at low pressure. When the bed on feed is to be regenerated, it is depressurized so that it can be regenerated at low pressure. The gas that comes out of the vessel during depressurization could simply be taken and fed back to the inlet of the compression system. However, in this case, all of the pressure energy in the gas is lost and has to be resupplied using the compression system. Alternatively, instead of feeding all the gas back to the feed of the compression system, the gas may be fed back to different stages of the compression system. As the pressure in the vessel falls, then so does the pressure of the gas that is extracted during the depressurization step. The gas is then fed to the appropriate stage of the compression system, depending upon the pressure of the gas at any point in time. In this way, the power required to compress this depressurization vent gas back up to the feed pressure is less than if the gas is fed to the compression system feed.

Where the first adsorption system comprises more than two vessels, instead of sending the gas extracted during a depressurization step to the compression system, it may be fed to another vessel that needs to be repressurized, i.e. a vessel that is being brought up in pressure so that it can be put on feed. These are known as equalization steps.

However, a problem arises when there are only two vessels, or more vessels where operation is not synchronized. At least one bed must be on feed so when one bed is stopped, a second bed must already be at pressure and ready to go on-line. Thus, in the two bed case, there is no bed at low pressure into which the gas extracted during depressurization can be put. The gas may be sent to the compressor. However, an alternative route is to include a gas storage vessel. Part of the depressurization gas can then be put into the storage vessel, i.e. the pressures between the adsorbent bed and the storage vessel can be equalized. Then, once the adsorbent bed is fully depressurized and regenerated, it can be reconnected with the storage vessel and the gas that was added to the storage vessel during the depressurization step, can be added back into the adsorption bed. This reduces the amount of gas supplied to repressurize the adsorbent bed back up to the feed pressure, i.e. pressure energy is saved. Multiple equalization steps may be used between storage vessels and/or between other beds to recover as much of the gas lost during the depressurization step as possible.

Thus, in embodiments using a multistage compression system, the gas from an adsorption vessel may be supplied to the stage of the compression system at the appropriate pressure. For example, the stages of a multistage compression system may be from 1 bar (0.1 MPa) to 3 bar (03. MPa) to 9 bar (0.9 MPa) to 30 bar (3 MPa). If no equalization steps are employed and the adsorption vessels are simply depressurized, as the pressure of the adsorption vessel falls from 30 bar (3 MPa) to 9 bar (0.9 MPa), then the gas is sent to the 9 bar (0.9 MPa) compressor stage outlet. As the vessel drops in pressure from 9 bar (0.9 MPa) to 3 bar (0.3 MPa), then the gas is sent to the 3 bar (0.3 MPa) compressor stage outlet, etc. The gas may be sent to the compressor before or after the water knock-out pots between stages. Part of the gas from the depressurization may be collected in the separate storage vessel at a final pressure of, for example, about 2 bar (0.2 MPa). The stored gas is then put back into the adsorption vessel it came from after the regeneration step to flush out the voids of the regenerating gas.

If the final regenerating gas inside the adsorption vessel is O2-rich, then this gas may be recycled to the oxyfuel combustion system. If the regenerating gas is $N_2$-rich, then this gas may be vented to atmosphere.

The carbon dioxide released during the final part of the depressurization step is sent either to the inlet of the compression system or to the combustion system.

Re-pressurization of the bed(s) is usually carried out by feeding either feed gas or product gas to the adsorption vessel.

During re-pressurization, carbon dioxide will be adsorbed and this can result in a significant temperature rise. For example, with silica gel, the delta carbon dioxide loading from 1 to 30 bar (0.1 to 3 MPa) at ambient temperature is about 4 mmol/g and the heat of adsorption of carbon dioxide is about 4.5 kcal/gmol. The adiabatic temperature rise on re-pressurization is about 70° C. (i.e. $4 \times 10^{-3}$ mol/g×4500 cal/mol/0.25 cal/g °C.). The corresponding value for alumina is about 45° C. This temperature heat pulse could be pushed out of the adsorbent bed when feed gas is feed through the adsorption bed, and into the downstream carbon dioxide purification step. This pulse in temperature could significantly upset this downstream process, particularly if the downstream process is a low temperature purification process. Therefore, methods may be required to mitigate the effect of this temperature rise after re-pressurization. One method is to initially run the re-pressurized bed and at least one other adsorbent bed on feed at the same time (i.e. a parallel step). Combining the two product streams will therefore reduce the variation in temperature observed at the inlet to the downstream carbon dioxide purification process. Alternatively or in addition to this parallel step, a heat exchanger can be placed between the adsorption vessel and the downstream carbon dioxide purification process, that is designed and controlled to minimize the downstream temperature variation.

The carbon dioxide-depleted gas that is rich in the non-condensable gas(es) may be expanded to generate power. Such expansion can be carried out in a number of intermediate stages with preheating before any and all stages. Preheating may be carried out using steam, hot water, or part of the heat of compression obtained from compressing the carbon dioxide feed gas. The feed pressures to the carbon dioxide recovery step may be at different levels, if expansion is carried out by intermediate stages.

In a preferred embodiment of the first aspect of the present invention, there is provided a method for method for removing water and at least $NO_2$ from carbon dioxide flue gas comprising water, $NO_x$, $O_2$ and $N_2$ as contaminants, generated from an oxyfuel combustion system, the method comprising:

passing the carbon dioxide flue gas at a first elevated pressure through a first adsorption system that selectively adsorbs water and $NO_2$ to produce dry $NO_2$-free carbon dioxide gas, the first adsorption system comprising at least one adsorbent bed;

purifying the $NO_2$-free carbon dioxide gas below 0° C. to produce purified carbon dioxide as a liquid and carbon dioxide-lean vapor comprising at least a major portion of said $O_2$ and $N_2$;

recovering carbon dioxide and $O_2$ from the carbon dioxide-lean vapor at a second elevated pressure to produce carbon dioxide-rich gas comprising $O_2$ and carbon dioxide-depleted gas that is rich in $N_2$;

using at least a portion of the carbon dioxide-rich gas to regenerate at least a portion of the adsorbent bed(s) of said first adsorption system and produce $NO_2$-enriched regeneration gas comprising $O_2$; and recycling at least a portion of the $NO_2$-enriched regeneration gas to the oxyfuel combustion system.

Apparatus according to the present invention comprises a first adsorption system for selectively adsorbing at least $NO_2$ from the carbon dioxide feed gas at a first elevated pressure to produce at least substantially $NO_2$-free carbon dioxide gas. The first adsorption system comprises at least one adsorbent bed. The apparatus further comprises a carbon dioxide purification system for purifying the at least substantially $NO_2$-free carbon dioxide gas to produce purified carbon dioxide and carbon dioxide-lean vapor comprising at least a major portion of said non-condensable gas(es); a conduit arrangement for feeding at least substantially $NO_2$-free carbon dioxide gas from the first adsorption system to the carbon dioxide purification system; a carbon dioxide recovery system for recovering carbon dioxide from the carbon dioxide-lean vapor at a second elevated pressure to produce carbon dioxide-rich gas and carbon dioxide-depleted gas that is rich in the non-condensable gas(es); a conduit arrangement for feeding carbon dioxide-lean vapor from the carbon dioxide purification system to the carbon dioxide recovery system; and a conduit arrangement for feeding at least a portion of the carbon dioxide-rich gas to the first adsorption system to regenerate at least a portion of the adsorbent bed(s) of the first adsorption system and produce $NO_2$-enriched regeneration gas.

In some embodiments, the carbon dioxide recovery system may comprise a carbon dioxide-selective permeable membrane separation system having a permeate side and a retentate side. In other embodiments, the carbon dioxide recovery system comprises a second adsorption system comprising at least one adsorbent bed that selectively adsorbs carbon dioxide.

The apparatus preferably comprises an oxyfuel combustion system for combusting a fuel selected from the group consisting of hydrocarbons and carbonaceous fuels in the presence of $O_2$ to produce heat and carbon dioxide flue gas; and a conduit arrangement for recycling at least a portion of said $NO_2$-enriched regeneration gas from said first adsorption system to said oxyfuel combustion system.

Aspects of the invention include:

1. A method for removing at least $NO_2$ from a carbon dioxide feed gas comprising $NO_x$ and at least one non-condensable gas as contaminants, said method comprising:

passing said carbon dioxide feed gas at a first elevated pressure through a first adsorption system that selectively adsorbs at least $NO_2$ to produce at least substantially $NO_2$-free carbon dioxide gas, said first adsorption system comprising at least one adsorbent bed;

purifying said at least substantially $NO_2$-free carbon dioxide gas to produce purified carbon dioxide and carbon dioxide-lean vapor comprising at least a major portion of said non-condensable gas(es);

recovering carbon dioxide from said carbon dioxide-lean vapor at a second elevated pressure to produce carbon dioxide-rich gas and carbon dioxide-depleted gas that is rich in said non-condensable gas(es); and using at least a portion of said carbon dioxide-rich gas to regenerate at least a portion of said adsorbent bed(s) of said first adsorption system and produce $NO_2$-enriched regeneration gas.

2. A method according to #1, wherein said first adsorption system also adsorbs NO from said feed gas such that said at least substantially $NO_2$-free carbon dioxide gas is at least substantially $NO_x$-free, and said $NO_2$-enriched regeneration gas comprises NO.

3. A method according to #1 or #2, wherein said first adsorption system comprises a NO-oxidation catalyst to oxidize NO in the presence of $O_2$ to produce $NO_2$ which is adsorbed by said first adsorption system, and desorbed on regeneration of said adsorbent bed(s) such that said $NO_2$-enriched regeneration gas comprises additional $NO_2$.

4. A method according to #1 or #2, wherein said first adsorption system comprises a NO-reduction catalyst to reduce NO in the presence of a reducing gas to produce $N_2$, said at least substantially $NO_2$-free carbon dioxide gas being enriched with $N_2$.

5. A method according to any of #1 to #4, wherein said carbon dioxide feed gas comprises $N_2O$ as a further contaminant and said first adsorption system adsorbs $N_2O$ from said feed gas such that said at least substantially $NO_2$-free carbon dioxide gas is at least $N_2O$-lean, and said $NO_2$-enriched regeneration gas comprises $N_2O$.

6. A method according to any of #1 to #5, wherein said carbon dioxide feed gas comprises water as a further contaminant and said first adsorption system adsorbs water from said feed gas such that said at least substantially $NO_2$-free carbon dioxide gas is at least substantially dry, and said $NO_2$-enriched regeneration gas comprises water.

7. A method according to any of #1 to #6, wherein said carbon dioxide feed gas comprises $SO_x$ as a further contaminant and said first adsorption system adsorbs $SO_x$ from said feed gas such that said at least substantially $NO_2$-free carbon dioxide gas is at least substantially $SO_x$-free, and said $NO_2$-enriched regeneration gas comprises $SO_x$.

8. A method according to any of #1 to #7, wherein said carbon dioxide feed gas comprises CO as a further contaminant and said first adsorption system adsorbs CO from said feed gas such that said at least substantially $NO_2$-free carbon dioxide gas is at least substantially CO-free.

9. A method according to any of #1 to #8, wherein said first adsorption system comprises a CO-oxidation catalyst to oxidize CO in the presence of $O_2$ to produce carbon dioxide such that said at least substantially $NO_2$-free carbon dioxide gas comprises additional carbon dioxide.

10. A method according to any of #1 to #9, wherein carbon dioxide is recovered from said carbon dioxide-lean vapor at said second elevated pressure by permeation across a carbon dioxide-selective permeable membrane to produce said carbon dioxide-rich gas as a permeate fraction and said carbon dioxide-depleted gas as a retentate fraction.

11. A method according to any of #1 to #10, wherein carbon dioxide is recovered from said carbon dioxide-lean vapor at said second elevated pressure by selective adsorption using a second adsorption system comprising at least one adsorbent bed that selectively adsorbs carbon dioxide to produce said carbon dioxide-depleted gas, said carbon dioxide-rich gas being produced on regeneration of said bed(s) of said second adsorption system.

12. A method according to any of #1 to #11, wherein said carbon dioxide feed gas comprises $O_2$ as a further contaminant, a portion of said $O_2$ being recovered with carbon dioxide such that said carbon dioxide-rich gas comprises $O_2$ and said $NO_2$-enriched regeneration gas comprises $O_2$.

13. A method according to #12, wherein said carbon dioxide-lean vapor has a first $O_2$ concentration and said carbon dioxide-rich gas has a second $O_2$ concentration that is greater than said first $O_2$ concentration in said carbon dioxide-lean vapor.

14. A method according to any of #1 to #13, wherein said carbon dioxide feed gas has a first flow rate and said portion of said carbon dioxide-rich gas used to regenerate said adsorption bed(s) has a second flow rate that is from about 5% to about 25% of said first flow rate of said carbon dioxide feed gas.

15. A method according to any of #1 to #14, wherein said carbon dioxide-rich gas is used to regenerate all said adsorbent bed(s) of said first adsorption system.

16. A method according to any of #1 to #14, wherein said carbon dioxide-rich gas is used to regenerate a portion of said adsorbent bed(s) of said first adsorption system, the remaining portion of said bed(s) being regenerated using at least one other regenerating gas.

17. A method according to any of #1 to #16, wherein said carbon dioxide feed gas is, or is derived from, flue gas generated in an oxyfuel combustion system, said method comprising recycling at least a portion of said $NO_2$-enriched regeneration gas to said oxyfuel combustion system.

18. A method according to #17, wherein said $NO_2$-enriched regeneration gas is at a pressure sufficient for recycling said gas to said oxyfuel combustion system without additional compression.

19. A method according to #17 or #18, comprising cooling said $NO_2$-enriched regeneration gas to produce aqueous condensate and removing said aqueous condensate prior to recycling said gas.

20. A method according to any of #17 to #19, comprising heating said $NO_2$-enriched regeneration gas to prevent production of aqueous condensate prior to recycling said gas.

21. A method for removing water and at least $NO_2$ from carbon dioxide flue gas comprising water, $NO_x$, $O_2$ and $N_2$ as contaminants, generated an oxyfuel combustion system, said method comprising:

passing said carbon dioxide flue gas at a first elevated pressure through a first adsorption system that selectively adsorbs water and $NO_2$ to produce dry substantially $NO_2$-free carbon dioxide gas, said first adsorption system comprising at least one adsorbent bed;

purifying said dry substantially $NO_2$-free carbon dioxide gas below 0° C. to produce purified carbon dioxide as a liquid and carbon dioxide-lean vapor comprising at least a major portion of said $O_2$ and $N_2$;

recovering carbon dioxide and $O_2$ from said carbon dioxide-lean vapor at a second elevated pressure to produce carbon dioxide-rich gas comprising $O_2$ and carbon dioxide-depleted gas that is rich in $N_2$;

using at least a portion of said carbon dioxide-rich gas to regenerate at least a portion of said adsorbent bed(s) of said first adsorption system and produce $NO_2$-enriched regeneration gas comprising $O_2$ and water; and recycling at least a portion of said $NO_2$-enriched regeneration gas to said oxyfuel combustion system.

22. An apparatus for removing at least $NO_2$ from a carbon dioxide feed gas comprising $NO_x$ and at least one non-condensable gas as contaminants, said apparatus comprising:

a first adsorption system for selectively adsorbing at least $NO_2$ from said feed gas at a first elevated pressure to produce at least substantially $NO_2$-free carbon dioxide gas, said first adsorption system comprising at least one adsorbent bed;

a carbon dioxide purification system for purifying said at least substantially $NO_2$-free carbon dioxide gas to produce purified carbon dioxide and carbon dioxide-lean vapor comprising at least a major portion of said non-condensable gas(es);

a conduit arrangement for feeding at least substantially $NO_2$-free carbon dioxide gas from said first adsorption system to said carbon dioxide purification system;

a carbon dioxide recovery system for recovering carbon dioxide from said carbon dioxide-lean vapor at a second elevated pressure to produce carbon dioxide-rich gas and carbon dioxide-depleted gas that is rich in said non-condensable gas(es);

a conduit arrangement for feeding carbon dioxide-lean vapor from said carbon dioxide purification system to said carbon dioxide recovery system;

a conduit arrangement for feeding at least a portion of said carbon dioxide-rich gas to said first adsorption system to regenerate at least a portion of said adsorbent bed(s) of said first adsorption system and produce $NO_2$-enriched regeneration gas.

23. An apparatus according to #22, wherein said carbon dioxide recovery system comprises a carbon dioxide-selective permeable membrane separation system having a permeate side and a retentate side.

24. An apparatus according to #22 or #23, wherein carbon dioxide recovery system comprises a second adsorption system comprising at least one adsorbent bed that selectively adsorbs carbon dioxide.

25. An apparatus according to #22 to #24, comprising:

an oxyfuel combustion system for combusting a fuel in the presence of $O_2$ to produce heat and carbon dioxide flue gas; and a conduit arrangement for recycling at least a portion of said $NO_2$-enriched regeneration gas from said first adsorption system to said oxyfuel combustion system.

The following is a discussion of the embodiments of the present invention exemplified in the Figures.

Referring to FIG. 1, a stream 2 of pulverized coal is fed, together with a stream 4 of $O_2$ (95% $O_2$; 1% $N_2$; and 4% Ar) to an oxyfuel combustion system 6 where the coal is combusted to produce heat and flue gas. A stream 8 of flue gas is removed from the oxyfuel combustion unit 6, washed in a wash column (not shown) to remove the water soluble components such as $SO_3$ and HCl to produce washed flue gas which is fed to a first stage 10 of a compression system where the gas is compressed to an initial elevated pressure of about 15 bar (1.5 MPa).

A stream 12 of compressed flue gas (72% $CO_2$; 19% $N_2$; 3% Ar; 6% $O_2$; and at least water, $SO_x$ and $NO_x$ as contaminants) is then fed to a $SO_2$ conversion reactor system 14 within which $SO_2$ in the flue gas is converted to sulfuric acid condensate. In $SO_2$ removal system 14, the compressed flue gas is maintained at the initial elevated pressure in the presence of $O_2$ from the flue gas and water in a first sour gas reactor (not shown) for a period of time sufficient to convert $SO_2$ to sulfuric acid condensate and produce $SO_2$-depleted flue gas. During this time, some of the $NO_x$ in the flue gas may also be converted to nitric acid condensate. The (mixed) acid condensate is separated from the $SO_2$-depleted flue gas and a stream 18 of the (mixed) acid condensate is removed and further processed as required.

A stream 16 of separated $SO_2$-depleted flue gas is removed from the $SO_2$ conversion reactor system 14 and is fed to a second stage 20 of the compression system where the gas is compressed to a first elevated pressure of about 30 bar (3 MPa).

A stream 22 of compressed $SO_2$-depleted flue gas is fed at the first elevated pressure to a $NO_x$ removal system 24 within which a portion of the $NO_x$ in the $SO_2$-depleted flue gas is converted to nitric acid condensate. In $NO_x$ removal system 24, the compressed $SO_2$-depleted flue gas is maintained at the first elevated pressure in the presence of $O_2$ from the flue gas and water in a second sour gas reactor (not shown) for a period of time sufficient to convert the portion of the $NO_x$ to nitric acid condensate and produce $NO_x$-lean flue gas. Residual $SO_2$ present in the $SO_2$-depleted flue gas will also be converted to sulfuric acid condensate during this time. The (mixed) acid condensate is separated from the $NO_x$-lean flue gas and a stream 28 of the (mixed) acid condensate is removed and further processed as required.

A stream 26 of separated $NO_x$-lean flue gas (73% $CO_2$; 19% $N_2$; 3% Ar; 5% $O_2$; and at least water and $NO_x$ as contaminants) is passed as a carbon dioxide feed gas at the first elevated pressure over the adsorbent bed(s) (not shown) of a first adsorption system 30. NO, $NO_2$ and water are adsorbed from the feed gas within the first adsorbent system to produce a stream 32 of dry substantially $NO_x$-free carbon dioxide gas (73% $CO_2$; 19% $N_2$; 3% Ar; and 5% $O_2$).

If there should be any CO or any residual $SO_x$ in the $NO_x$-lean flue gas, then these contaminants would also be removed from the gas by adsorption on to the surface of the adsorption bed(s) of the first adsorption system 30.

Stream 32 is fed to a carbon dioxide purification system 34 where it is cooled by indirect heat exchange against a coolant (not shown) to condense carbon dioxide in the gas and produce carbon dioxide liquid and carbon dioxide-lean vapor comprising the majority of the non-condensable gases (e.g. $N_2$, Ar and $O_2$) which are then separated in a phase separation unit (not shown). The carbon dioxide-lean vapor may be cooled further by indirect heat exchange (not shown) to condense additional carbon dioxide and produce carbon dioxide-depleted vapor comprising the non-condensable gases. The additional liquid carbon dioxide may be separated from the carbon-dioxide-depleted vapor in a further phase separation unit (not shown).

A stream 36 of purified carbon dioxide liquid (96% $CO_2$; 2% $N_2$; 1% Ar; and 1% $O_2$) is removed from the carbon dioxide purification system 34, and may be further pressurized as required (not shown) and sent to storage or used in EOR.

A stream 38 of carbon dioxide-lean vapor (29% $CO_2$; 51% $N_2$; 7% Ar; and 13% $O_2$) is removed from the carbon dioxide purification system 34 and fed at a second elevated pressure (which is the same as the first elevated pressure subject to any inherent pressure drop in the apparatus downstream of the second compression stage 20) to a carbon dioxide recovery system 40 comprising at least one carbon dioxide-selective permeable membrane separation system (not shown). Carbon dioxide and oxygen permeate across the membrane(s) in the membrane separation system to produce carbon dioxide/$O_2$-rich gas as a permeate fraction and carbon dioxide-depleted gas that is rich in $N_2$ and Ar as a retentate fraction.

A stream 44 of the carbon dioxide-depleted gas (7% $CO_2$; 73% $N_2$; 9% Ar; and 10% $O_2$) is removed from the carbon dioxide recovery system 40, expanded in an expansion system (not shown) to generate work and the resultant expanded gas is vented to the atmosphere.

A stream 42 of the carbon dioxide/$O_2$-rich gas (62% $CO_2$; 16% $N_2$; 5% Ar; and 16% $O_2$), which is at about atmospheric pressure, is removed from the carbon dioxide recovery system 40 and recycled without pressure adjustment to the first adsorption system 30 where it is used to regenerate the adsorbent bed(s) and produce $NO_2$-enriched regeneration gas comprising NO and water. A stream 46 of $NO_2$-enriched regeneration gas (62% $CO_2$; 16% $N_2$; 5% Ar; 16% $O_2$; and at least water and $NO_x$ as contaminants) is removed from the first adsorption system 30 and recycled to the oxyfuel combustion system 6 to provide part of the $O_2$ requirement for combustion.

Any CO and $SO_x$ adsorbed on to the adsorbent bed(s) of the first adsorption system 30 would be desorbed on regeneration and recycled to the oxyfuel combustion system 6 with the $NO_2$-enriched regeneration gas.

Figure 2:
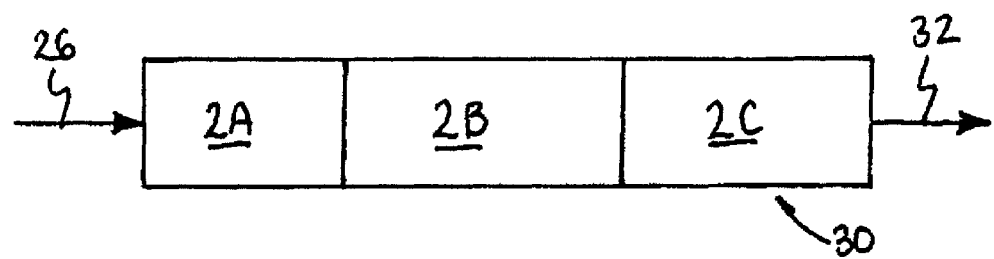
FIG. 2 is a schematic representation of an adsorbent bed for a first adsorption system, in which the adsorbent bed has three adsorbent layers.
Figure 3:
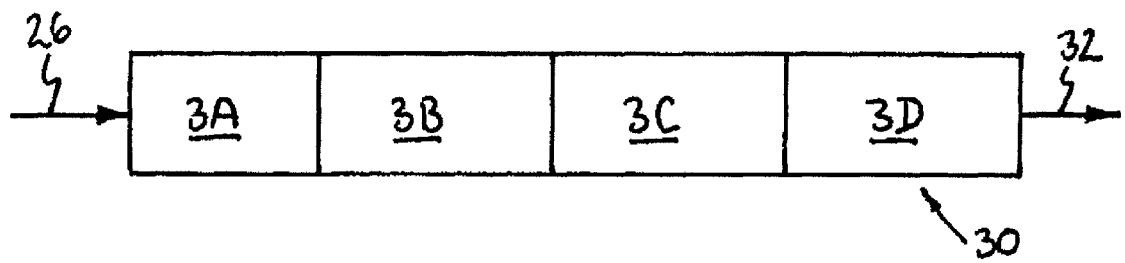
FIG. 3 is a schematic representation of an adsorbent bed for a first adsorption system, in which the adsorbent bed has four adsorbent layers.

FIGS. 2 and 3 depict a selection of possible arrangements of layers within an adsorbent bed in the first adsorption system 30. In both figures, the direction of flow of carbon dioxide feed gas during the adsorption phase of the adsorption/regeneration cycle of the first adsorption system is indicated by the stream 26 into the bed and stream 32 leaving the bed.

In a first arrangement of the layers of the bed depicted in FIG. 2, layer 2A is an acid stable desiccant selected from the group consisting of silica gel, porous glass; zeolites and mixtures thereof; layer 2B has a higher water capacity than layer 2A and is selected from the group consisting of activated alumina, silica gel, 3A zeolite and mixtures thereof; and layer 2C has a higher water capacity that layer 2B, e.g. 3A zeolite.

In a second arrangement of the layers of the bed depicted in FIG. 2, layer 2A is a desiccant selected from the group consisting of alumina, silica gel, activated carbon and mixtures thereof; layer 2B is a reversible $SO_x$ adsorbent selected from the group consisting of alumina, silica gel, zeolites and mixtures thereof; and layer 2C is a reversible $NO_x$ adsorbent selected from the group consisting of alumina, silica gel, zeolites; metal oxides (either supported or neat, i.e. unsupported) and mixtures thereof.

The desiccants for layer 2A are preferred to zeolites as they have a low heat of water adsorption and a low Henry's Law constant. This allows water to be desorbed in pressure swing mode and reduces the thermal energy (and heater power) required for water desorption versus a zeolite.

$SO_x$ in the presence of water and $O_2$ can chemically attack zeolites owing to the production of sulfuric acid and subsequent leeching of aluminum ions from the zeolite structure. However, zeolites can reversibly adsorb $SO_x$ in the absence of water since the reduction of sulfuric acid is restricted. Therefore, the desiccant layer 2A acts as a guard bed for the reversible $SO_x$ adsorbent.

The key challenge for the final layer, layer 2C, is NO removal. The majority of $NO_x$ in feed stream 26 is expected to be NO. The adsorbent capacity of most adsorbents for NO is less than that for $NO_2$. Therefore, adsorbents with high NO capacities are required for layer 2C in this arrangement. Possible adsorbent materials include transition metal exchanged zeolites and transition metal oxide supported materials.

In a third arrangement of the layers of the bed depicted in FIG. 2, layer 2A is a desiccant selected from the group consisting of alumina, silica gel, activated carbon and mixtures thereof; layer 2B is a reversible $SO_x$ adsorbent selected from the group consisting of alumina, silica gel, zeolites and mixtures thereof; and layer 2C is a reversible $NO_2$ adsorbent selected from the group consisting of alumina, silica gel, zeolites; metal oxides and mixtures thereof.

The first two layers, layers 2A and 2B, of the third arrangement are the same as the first two layers of the second arrangement. However, the final layer, layer 2C, adsorbs all of the $NO_2$ in the feed stream 26 and allows at least some NO to exit the first adsorption system. Since adsorbents typically have higher $NO_2$ capacity than NO capacity, the length of the final layer can be less than in the first arrangement since only $NO_2$ removal is required. $NO_2$ removal is required for embodiments in which the carbon dioxide is purified downstream of the first adsorbent system in a low temperature, i.e. below 0° C., process producing liquid carbon dioxide or else it will freeze out. However, NO will not freeze out in such low temperature processes. In contrast, the NO will end up in the carbon dioxide-lean vapor and, finally, in the carbon dioxide-rich gas used to regenerate the adsorbent bed(s) of the first adsorption system.

In a first arrangement of the layers of the bed depicted in FIG. 3, layer 3A is a desiccant selected from the group consisting of alumina, silica gel, activated carbon and mixtures thereof; layer 3B is a reversible $SO_x$ adsorbent selected from the group consisting of alumina, silica gel, zeolites and mixtures thereof; layer 3C is a (supported or unsupported) CO/NO-oxidation catalyst (or CO/NO adsorbent) selected from the group consisting of transition metal-based catalysts, noble metal-based catalysts and mixtures thereof; and layer 3D is a reversible $NO_2$ adsorbent selected from the group consisting of alumina, silica gel, zeolites, metal oxides, and mixtures thereof.

The first two layers, layers 3A and 3B, in this arrangement are the same as that for previous arrangements, i.e. a desiccant layer followed by reversible $SO_x$ removal layer.

The third layer, layer 3C, is in-bed catalyst layer to oxidize any CO and NO in the feed stream 26 to $CO_2$ and $NO_2$ respectively. Since $NO_2$ is easier to adsorb than NO, conversion of NO to $NO_2$ reduces the size the adsorbent bed required for $NO_x$ removal. Both water and $SO_x$ must be removed prior to the catalyst layer 3C because the oxidation catalysts used (e.g. hopcalite-type (CuO/MnO) catalysts) are deactivated by water and $SO_x$ (hence layers 3A and 3B). Thus, after water and $SO_x$ are removed, an oxidation catalyst can convert CO to $CO_2$ and NO to $NO_2$.

The final adsorbent layer, layer 3D, is a material for reversible $NO_2$ adsorption.

Advantages of this arrangement include removal of any CO from the feed gas and reduction of the length of the layer required for $NO_2$ removal.

In a second arrangement of the layers of the bed depicted in FIG. 3, layer 3A is a desiccant selected from the group consisting of alumina, silica gel, activated carbon and mixtures thereof; layer 3B is a reversible $SO_x$ adsorbent selected from the group consisting of alumina, silica gel, zeolites and mixtures thereof; layer 3C is a (supported or unsupported) NO-reduction oxidation catalyst (or CO/NO adsorbent) selected from the group consisting of transition metal catalysts, noble metal catalysts and mixtures thereof; and layer 3D is a reversible $NO_2$ adsorbent selected from the group consisting of alumina, silica gel, zeolites, metal oxides, and mixtures thereof.

The second arrangement of FIG. 3 is the same as the first arrangement except the catalyst layer, layer 3C, is a NO-reduction catalyst similar to that used in SCR processes. Typical catalysts include vanadium oxide and tungsten oxide. In this arrangement, the NO present in the feed gas 26 is converted to $N_2$ over the catalyst in the presence of an appropriate reducing gas such as CO or $NH_3$.

Advantages of this arrangement include removal of CO from the feed gas and the conversion of NO to $N_2$ which will not freeze in a low temperature carbon dioxide purification process, and which is also not a toxic gas so can be vented without recovery.

Figure 4:
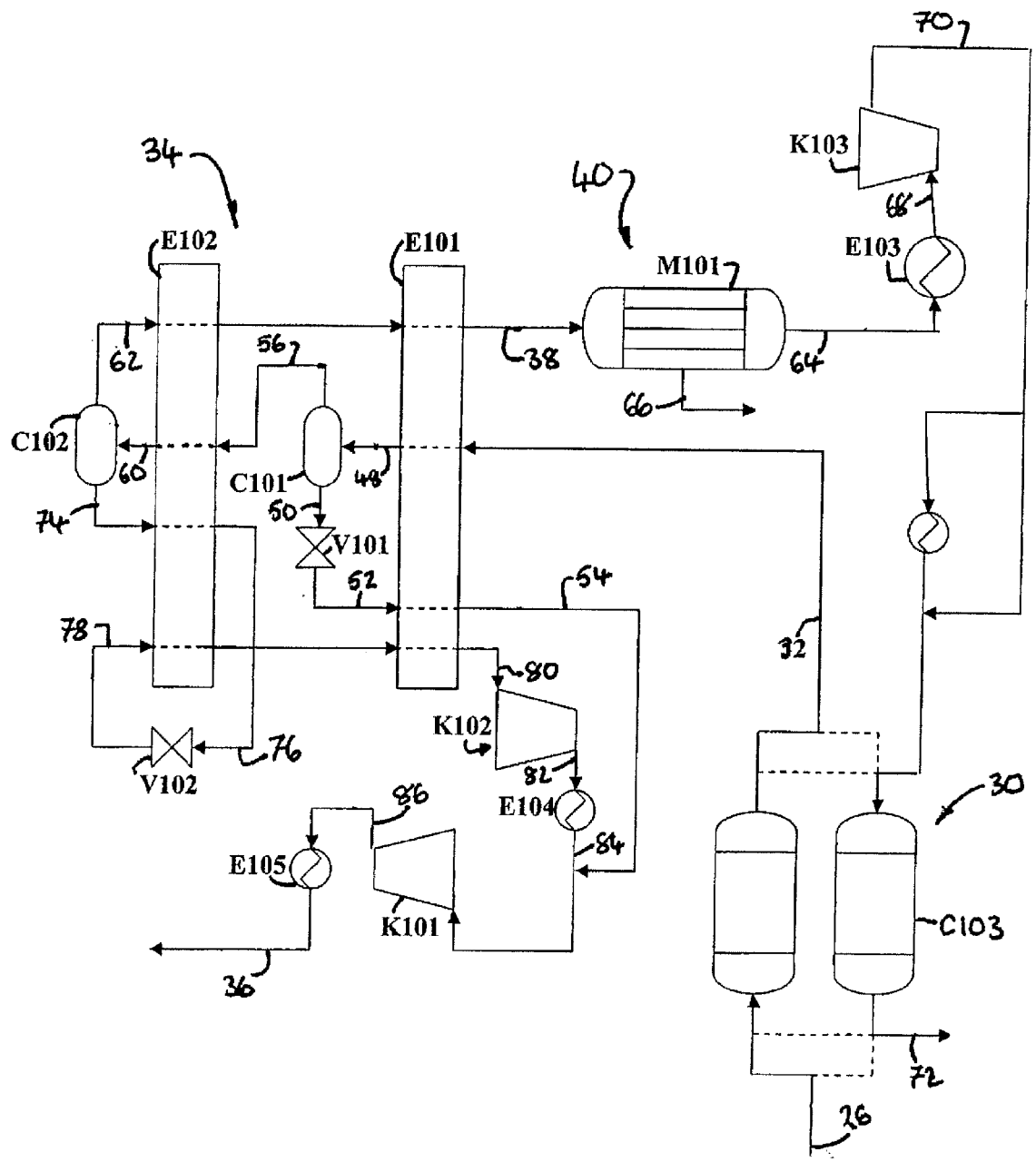
FIG. 4 is a flow sheet for a comparative example taken from US 2008/0176174 A.

The flow sheet of FIG. 4 is based on the process depicted in FIG. 2 of US 2008/0176174 A and has been included in this specification for the purposes of comparison with the present invention. The features that are common between FIGS. 1 and 4 of the present application have been given the same reference numbers In FIG. 4, stream 26 of flue gas is fed at a first elevated pressure of about 30 bar (3 MPa) to the first adsorption system 30 which contains at two parallel adsorbent beds C103. Water is removed from the flue gas by adsorption on to the adsorbent bed(s) and dry flue gas leaves the adsorbent system 30.

A stream 32 of dry flue gas is fed to a low temperature carbon dioxide purification system 34 where the stream is cooled and partially condensed by indirect heat exchange in heat exchange system E101 to produce a two phase stream 48 which is fed to a first phase separator system C101 where the vapor and liquid phases of the stream are separated.

The liquid phase, containing substantially pure carbon dioxide, is removed as stream 50, passed across expansion valve V101 to produce a stream 52 of expanded carbon dioxide liquid at about 17.5 bar (1.7 MPa). Stream 52 is warmed by indirect heat exchange in heat exchange system E101 to produce a stream 54 of warmed carbon dioxide which is then compressed in a first compression system K101 to produce a stream 86 of compressed carbon dioxide at about 110 bar (11 MPa). Stream 86 is cooled by indirect heat exchange against a coolant in heat exchange system E105 to produce a stream 36 of cooled, compressed carbon dioxide.

The vapor phase, comprising carbon dioxide and the majority of the non-condensable gases from the flue gas, is removed from the first phase separator system C101 as stream 56 and cooled by indirect heat exchange in heat exchange system E102 to produce a two phase stream 60 which is fed to a second phase separator system C102 where the vapor and liquid phases of the stream are separated.

The liquid phase, containing substantially pure carbon dioxide, is removed as stream 74, warmed by indirect heat exchange in heat exchange system E102 to produce a stream 76 of warmed carbon dioxide which is then passed across expansion valve V102 to produce a stream 78 of expanded carbon dioxide at about 8.7 bar (0.8 MPa). Stream 78 is warmed by indirect heat exchange in heat exchange systems E102 and E101 to produce a stream 80 of warmed carbon dioxide which is compressed in a second compression system K102 to produce a stream 82 of compressed carbon dioxide at about 17.4 bar (1.7 MPa). Stream 82 is cooled by indirect heat exchange against a coolant in a heat exchange system E104 to produce a stream 84 of cooled, compressed carbon dioxide which is combined with stream 54 prior to being further compressed to about 110 bar (11 MPa).

The carbon dioxide-lean vapor phase, comprising the majority of the non-condensable gases from the flue gas, is removed from the second phase separator C102 as stream 62 and warmed by indirect heat exchange in heat exchange systems E102 and E101 to produce a stream 38 of warmed non-condensable gases-rich gas which is fed at about 30 bar (3 MPa) to a carbon dioxide recovery system 40 comprising a selective membrane separation system M101. Carbon dioxide and $O_2$ permeate across the membrane(s) in the membrane separation system M101 to produce carbon dioxide/$O_2$-rich gas as a permeate fraction and carbon dioxide-depleted gas which is rich in $N_2$ and Ar as a retentate fraction.

A stream 66 of the carbon dioxide/$O_2$-rich gas is recycled to the oxyfuel combustion system (not shown) producing the flue gas.

A stream 64 of the $N_2$/Ar-rich gas is heated by indirect heat exchange in heat exchange system E103 to produce a stream 68 of heated gas which is expanded in expansion system K103 to produce a stream 70 of expanded $N_2$/Ar-rich gas. Stream 70 is used, optionally after at least a portion of which has been heated, to regenerate the adsorbent beds C103 of adsorbent system 30. A stream 72 of spent regeneration gas is then typically vented.

Figure 5:
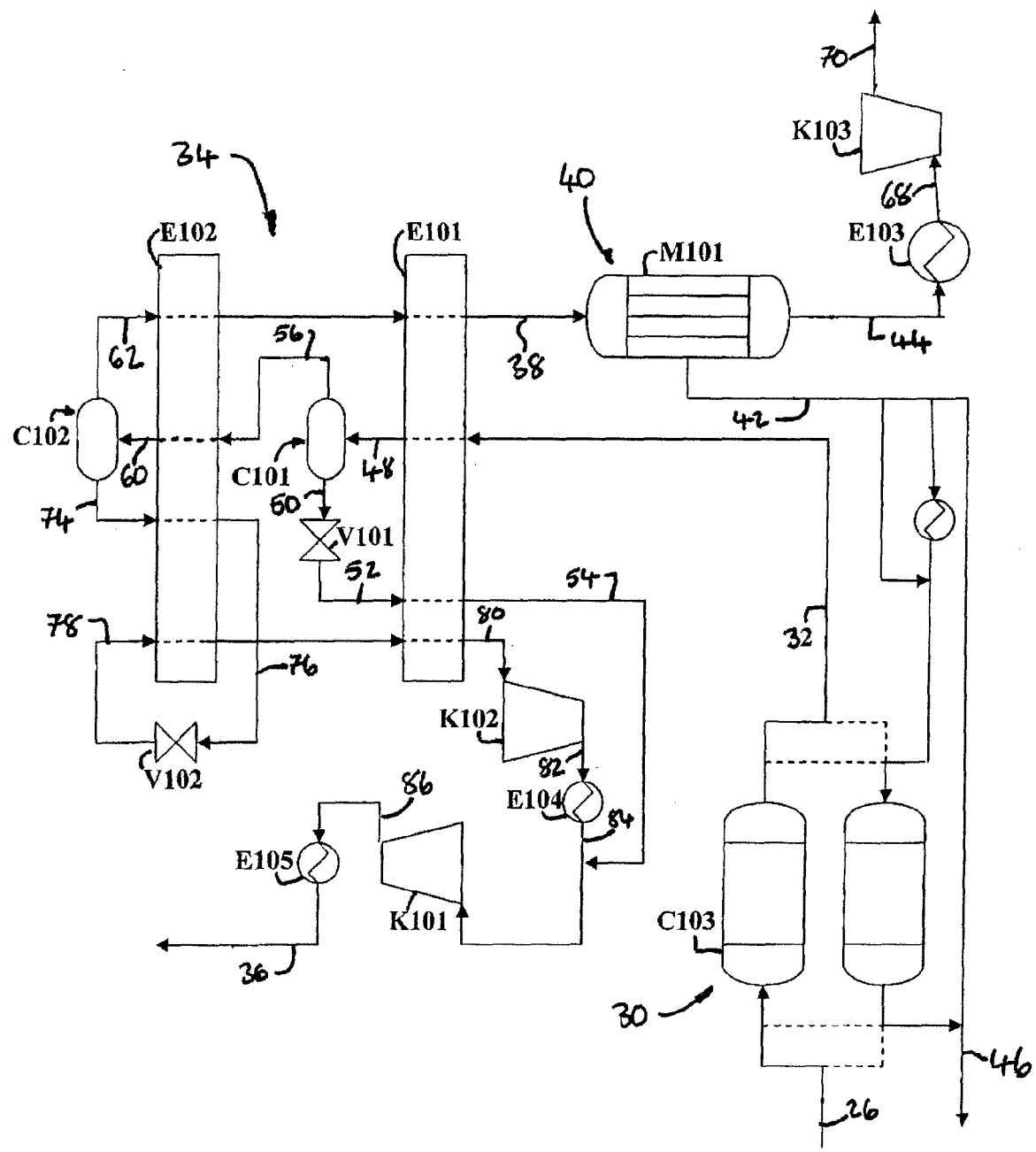
FIG. 5 is a flow sheet for an embodiment of the present invention based on the process depicted in FIG. 4.

The flow sheet of FIG. 5 depicts an embodiment of the present invention based on the process depicted in FIG. 4. In FIG. 5, the adsorbent beds C103 of the adsorbent system 30 are not regenerated using the $N_2$/Ar-rich retentate gas fraction from the membrane separator system M101 of the carbon dioxide recovery system 40. In contrast, the beds C103 are regenerated using the $O_2$/carbon dioxide-rich permeate gas fraction from the membrane separator system M101.

The features of the process depicted in FIG. 5 that are common to the process depicted in FIG. 4 have been given the same reference numbers. The following is a discussion of the different features of the process in FIG. 5.

Water, $NO_2$ and $N_2O$ are removed from the flue gas by adsorption on to the adsorbent bed(s) C103 and dry $NO_x$-lean flue gas leaves the adsorbent system 30. In embodiments where the adsorbent beds comprise a CO-oxidation catalyst, CO from the flue gas is oxidized in the presence of $O_2$ to produce $CO_2$ which leaves the adsorbent system 30 with the dry $NO_x$-lean flue gas. In addition, where the CO-oxidation catalyst also capable of oxidizing NO, NO from the flue gas is oxidized in the presence of $O_2$ to form $NO_2$ which is adsorbed by the adsorbent beds C103. Alternatively, the adsorbent beds may comprise a NO-reduction catalyst for reducing NO in the presence of a reducing gas such as methane and/or CO, to form $N_2$ which leaves the adsorbent system 30 with the dry $NO_x$-lean flue gas.

A stream 42 of $O_2$/carbon dioxide-rich gas is removed from the permeate side of the selective membrane separation system M101 and at least a portion of this stream is fed, optionally after heating at least a part of this portion of the stream, to the adsorption system 30 to regenerate the beds C103. After regenerating the beds, the wet $NO_2$-enriched regeneration gas is then recycled to the oxyfuel combustion system (not shown), optionally after being combined with a portion of the $O_2$/carbon dioxide-rich gas that is not used to regenerate the adsorbent beds C103.

A stream 44 of $N_2$/Ar-rich gas is removed from the retentate side of the membrane separation system M101, heated by indirect heat exchange in heat exchange system E103 to produce the stream 68 of heated gas which is expanded in expansion system K103 to produce the stream 70 of expanded $N_2$/Ar-rich gas. Stream 70 may then be vented.

Comparative Example

By way of a comparative example, a computer simulation using the APSEN™ Plus software (version 2006.5; ©Aspen Technology, Inc.) has been carried out in respect of the process depicted in FIG. 4 which is taken from US 2008/0176174 A (see FIG. 2 and Table 3 therefrom). The inlet concentrations of NO and $NO_2$ have been changed from those concentrations given in Table 3 of US 2008/0176174 A, and CO and $N_2O$ have been added as additional components. The adsorption unit 30 is designed only to remove water and is regenerated using stream 70 of waste gas obtained after expanding the carbon dioxide-depleted gas that is rich in the non-condensable gas(es). Stream 72 would typically be vented to atmosphere.

A figure for the temperature of stream 72 leaving the adsorption system 30 after regeneration of the adsorbent bed(s) therein, has not been provided as the temperature of this stream is not constant, varying considerably during the regeneration process.

The results of the simulations are presented in the following heat and mass balance tables.

In the comparative example, vented stream 72 contains significant quantities of NO and CO, and carbon dioxide product stream 36 contains significant quantities of $NO_2$ and $N_2O$.

Example

Computer simulations using the APSEN™ Plus software have also been carried out in respect of the embodiment of the present invention depicted in FIG. 5 which is a modified version of process depicted in FIG. 4.

In this connection, a first simulation has been carried out in which the adsorption unit C103 contains extra layers of adsorbent material for removing $NO_2$ and $N_2O$. In addition, carbon dioxide-rich stream 42 from the carbon dioxide recovery system 40 is used to regenerate the adsorption system 30, rather than the stream 70 of expanded carbon dioxide-depleted gas comprising the non-condensable gas(es).

In addition, a second simulation has been carried out which is the same as the first simulation with the exception that an

TABLE 1

| Process of FIG. 4 | | | | | | | | | |
|---|---|---|---|---|---|---|---|---|---|
| Stream | — | 26 | 32 | 48 | 50 | 52 | 54 | 56 | 60 |
| Pressure | bar | 30 | 30 | 29.8 | 29.8 | 17.45495 | 17.35495 | 29.8 | 29.7 |
| | (MPa) | (3) | (3) | (3) | (3) | (1.7) | (1.7) | (3) | (3) |
| Temperature | ° C. | 24.29 | 24.29 | −33.43 | −33.43 | −38.41 | 15.56 | −33.43 | −50.00 |
| Flow Rate | kg/s | 158.33 | 155.65 | 155.65 | 82.93 | 82.93 | 82.93 | 72.72 | 72.72 |
| $CO_2$ | mol % | 73.1154 | 72.8477 | 72.8477 | 96.8240 | 96.8240 | 96.8240 | 49.6485 | 49.6485 |
| $N_2$ | mol % | 18.8809 | 19.1573 | 19.1573 | 2.0937 | 2.0937 | 2.0937 | 35.6677 | 35.6677 |
| Ar | mol % | 2.9635 | 3.0069 | 3.0069 | 0.3805 | 0.3805 | 0.3805 | 5.5481 | 5.5481 |
| $O_2$ | mol % | 4.8243 | 4.8949 | 4.8949 | 0.6163 | 0.6163 | 0.6163 | 9.0348 | 9.0348 |
| $H_2O$ | ppm | 1239.86 | 0.38 | 0.38 | 0.49 | 0.49 | 0.49 | 0.27 | 0.27 |
| NO | ppm | 239.78 | 243.29 | 243.29 | 47.01 | 47.01 | 47.01 | 433.20 | 433.20 |
| $NO_2$ | ppm | 179.84 | 182.47 | 182.47 | 367.47 | 367.47 | 367.47 | 3.46 | 3.46 |
| $N_2O$ | ppm | 299.73 | 304.11 | 304.11 | 413.54 | 413.54 | 413.54 | 198.24 | 198.24 |
| CO | ppm | 199.82 | 202.74 | 202.74 | 26.17 | 26.17 | 26.17 | 373.59 | 373.59 |
| Stream | — | 62 | 38 | 64 | 66 | 68 | 70 | 72 | 74 |
| Pressure | bar | 29.7 | 29.65 | 29.65 | 1.1 | 29.65 | 1.1 | 1.1 | 29.7 |
| | (MPa) | (3) | (3) | (3) | (0.1) | (3) | (0.1) | (0.1) | (3) |
| Temperature | ° C. | −50.00 | 15.56 | 15.56 | 15.56 | 300.00 | 4.27 | — | −50.00 |
| Flow Rate | kg/s | 46.29 | 46.29 | 25.21 | 21.07 | 25.21 | 25.21 | 27.90 | 26.43 |
| $CO_2$ | mol % | 28.8999 | 28.8999 | 7.1771 | 62.0327 | 7.1771 | 7.1771 | 13.1541 | 95.9951 |
| $N_2$ | mol % | 50.4330 | 50.4330 | 72.6435 | 16.5563 | 72.6435 | 72.6435 | 67.5164 | 2.6862 |
| Ar | mol % | 7.8057 | 7.8057 | 9.6925 | 4.9279 | 9.6925 | 9.6925 | 9.0124 | 0.5051 |
| $O_2$ | mol % | 12.7384 | 12.7384 | 10.3341 | 16.4055 | 10.3341 | 10.3341 | 9.6238 | 0.7621 |
| $H_2O$ | ppm | 0.17 | 0.17 | 0.00 | 0.42 | 0.00 | 0.00 | 5509.67 | 0.49 |
| NO | ppm | 592.35 | 592.35 | 735.53 | 373.96 | 735.53 | 735.53 | 684.05 | 77.72 |
| $NO_2$ | ppm | 0.03 | 0.03 | 0.03 | 0.02 | 0.03 | 0.03 | 1.63 | 11.14 |
| $N_2O$ | ppm | 111.71 | 111.71 | 138.71 | 70.52 | 138.71 | 138.71 | 131.27 | 391.51 |
| CO | ppm | 525.55 | 525.55 | 652.58 | 331.79 | 652.58 | 652.58 | 606.79 | 34.16 |
| Stream | — | 76 | 78 | 80 | 82 | 84 | 86 | 36 | |
| Pressure | bar | 29.65 | 8.664452 | 8.464452 | 17.35495 | 17.35495 | 110 | 110 | |
| | (MPa) | (3) | (0.8) | (0.8) | (1.7) | (1.7) | (11) | (11) | |
| Temperature | ° C. | −42.97 | −54.56 | 15.56 | 72.00 | 25.00 | 183.64 | 43.00 | |
| Flow Rate | kg/s | 26.43 | 26.43 | 26.43 | 26.43 | 26.43 | 109.36 | 109.36 | |
| $CO_2$ | mol % | 95.9951 | 95.9951 | 95.9951 | 95.9951 | 95.9951 | 96.6232 | 96.6232 | |
| $N_2$ | mol % | 2.6862 | 2.6862 | 2.6862 | 2.6862 | 2.6862 | 2.2372 | 2.2372 | |
| Ar | mol % | 0.5051 | 0.5051 | 0.5051 | 0.5051 | 0.5051 | 0.4107 | 0.4107 | |
| $O_2$ | mol % | 0.7621 | 0.7621 | 0.7621 | 0.7621 | 0.7621 | 0.6516 | 0.6516 | |
| $H_2O$ | ppm | 0.49 | 0.49 | 0.49 | 0.49 | 0.49 | 0.49 | 0.49 | |
| NO | ppm | 77.72 | 77.72 | 77.72 | 77.72 | 77.72 | 54.45 | 54.45 | |
| $NO_2$ | ppm | 11.14 | 11.14 | 11.14 | 11.14 | 11.14 | 281.17 | 281.17 | |
| $N_2O$ | ppm | 391.51 | 391.51 | 391.51 | 391.51 | 391.51 | 408.20 | 408.20 | |
| CO | ppm | 34.16 | 34.16 | 34.16 | 34.16 | 34.16 | 28.11 | 28.11 | | oxidation catalyst is added to the adsorbent beds of the adsorption system, to convert CO and NO in the presence of $O_2$ into carbon dioxide and $NO_2$ respectively.

A figure for the temperature of stream 46 leaving the adsorption system 30 after regeneration of the adsorbent bed(s) therein, has not been provided as the temperature of this stream is not constant, varying considerably during the regeneration process.

The results of the simulations are presented in the following heat and mass balance tables.

TABLE 2

Embodiment of FIG. 5 (without catalyst)

| Stream | — | 26 | 32 | 48 | 50 | 52 | 54 | 56 | 60 |
|---|---|---|---|---|---|---|---|---|---|
| Pressure | bar | 30 | 30 | 29.8 | 29.8 | 17.45495 | 17.35495 | 29.8 | 29.7 |
|  | (MPa) | (3) | (3) | (3) | (3) | (1.7) | (1.7) | (3) | (3) |
| Temperature | °C. | 24.29 | 24.29 | −33.43 | −33.43 | −38.42 | 15.56 | −33.43 | −50.00 |
| Flow Rate | kg/s | 158.33 | 155.57 | 155.57 | 82.81 | 82.81 | 82.81 | 72.76 | 72.76 |
| $CO_2$ | mol % | 73.1154 | 72.8796 | 72.8796 | 96.8918 | 96.8918 | 96.8918 | 49.6874 | 49.6874 |
| $N_2$ | mol % | 18.8809 | 19.1657 | 19.1657 | 2.0963 | 2.0963 | 2.0963 | 35.6522 | 35.6522 |
| Ar | mol % | 2.9635 | 3.0082 | 3.0082 | 0.3807 | 0.3807 | 0.3807 | 5.5459 | 5.5459 |
| $O_2$ | mol % | 4.8243 | 4.8970 | 4.8970 | 0.6166 | 0.6166 | 0.6166 | 9.0313 | 9.0313 |
| $H_2O$ | ppm | 1239.86 | 0.38 | 0.38 | 0.49 | 0.49 | 0.49 | 0.27 | 0.27 |
| NO | ppm | 239.78 | 243.40 | 243.40 | 47.04 | 47.04 | 47.04 | 433.05 | 433.05 |
| $NO_2$ | ppm | 179.84 | 9.15 | 9.15 | 18.43 | 18.43 | 18.43 | 0.17 | 0.17 |
| $N_2O$ | ppm | 299.73 | 39.63 | 39.63 | 53.91 | 53.91 | 53.91 | 25.84 | 25.84 |
| CO | ppm | 199.82 | 202.83 | 202.83 | 26.20 | 26.20 | 26.20 | 373.43 | 373.43 |
| Stream | — | 62 | 38 | 44 | 42 | 46 | 68 | 70 | 74 |
| Pressure | bar | 29.7 | 29.65 | 29.65 | 1.1 | 1.1 | 29.65 | 1.1 | 29.7 |
|  | (MPa) | (3) | (3) | (3) | (0.1) | (0.1) | (3) | (0.1) | (3) |
| Temperature | °C. | −50.00 | 15.56 | 15.56 | 15.56 | — | 300.00 | 4.26 | −50.00 |
| Flow Rate | kg/s | 46.29 | 46.29 | 25.21 | 21.08 | 23.84 | 25.21 | 25.21 | 26.47 |
| $CO_2$ | mol % | 28.9105 | 28.9105 | 7.1805 | 62.0451 | 64.7677 | 7.1805 | 7.1805 | 96.0301 |
| $N_2$ | mol % | 50.4317 | 50.4317 | 72.6496 | 16.5531 | 14.9854 | 72.6496 | 72.6496 | 2.6864 |
| Ar | mol % | 7.8059 | 7.8059 | 9.6937 | 4.9271 | 4.4259 | 9.6937 | 9.6937 | 0.5051 |
| $O_2$ | mol % | 12.7387 | 12.7387 | 10.3355 | 16.4032 | 14.6688 | 10.3355 | 10.3355 | 0.7620 |
| $H_2O$ | ppm | 0.17 | 0.17 | 0.00 | 0.43 | 8070.29 | 0.00 | 0.00 | 0.49 |
| NO | ppm | 592.36 | 592.36 | 735.62 | 373.90 | 336.06 | 735.62 | 735.62 | 77.72 |
| $NO_2$ | ppm | 0.00 | 0.00 | 0.00 | 0.00 | 1112.30 | 0.00 | 0.00 | 0.56 |
| $N_2O$ | ppm | 14.56 | 14.56 | 18.08 | 9.19 | 1705.91 | 18.08 | 18.08 | 51.02 |
| CO | ppm | 525.53 | 525.53 | 652.64 | 331.72 | 297.98 | 652.64 | 652.64 | 34.17 |
| Stream | — | 76 | 78 | 80 | 82 | 84 | 86 | 36 |  |
| Pressure | bar | 29.65 | 8.664452 | 8.464452 | 17.35495 | 17.35495 | 110 | 110 |  |
|  | (MPa) | (3) | (0.8) | (0.8) | (1.7) | (1.7) | (11) | (11) |  |
| Temperature | °C. | −42.97 | −54.57 | 15.56 | 72.00 | 25.00 | 183.65 | 43.00 |  |
| Flow Rate | kg/s | 26.47 | 26.47 | 26.47 | 26.47 | 26.47 | 109.28 | 109.28 |  |
| $CO_2$ | mol % | 96.0301 | 96.0301 | 96.0301 | 96.0301 | 96.0301 | 96.6826 | 96.6826 |  |
| $N_2$ | mol % | 2.6864 | 2.6864 | 2.6864 | 2.6864 | 2.6864 | 2.2395 | 2.2395 |  |
| Ar | mol % | 0.5051 | 0.5051 | 0.5051 | 0.5051 | 0.5051 | 0.4109 | 0.4109 |  |
| $O_2$ | mol % | 0.7620 | 0.7620 | 0.7620 | 0.7620 | 0.7620 | 0.6519 | 0.6519 |  |
| $H_2O$ | ppm | 0.49 | 0.49 | 0.49 | 0.49 | 0.49 | 0.49 | 0.49 |  |
| NO | ppm | 77.72 | 77.72 | 77.72 | 77.72 | 77.72 | 54.48 | 54.48 |  |
| $NO_2$ | ppm | 0.56 | 0.56 | 0.56 | 0.56 | 0.56 | 14.10 | 14.10 |  |
| $N_2O$ | ppm | 51.02 | 51.02 | 51.02 | 51.02 | 51.02 | 53.21 | 53.21 |  |
| CO | ppm | 34.17 | 34.17 | 34.17 | 34.17 | 34.17 | 28.13 | 28.13 |  |

TABLE 3

Embodiment of FIG. 5 (with catalyst)

| Stream | — | 26 | 32 | 48 | 50 | 52 | 54 | 56 | 60 |
|---|---|---|---|---|---|---|---|---|---|
| Pressure | bar | 30 | 30 | 29.8 | 29.8 | 17.45495 | 17.35495 | 29.8 | 29.7 |
|  | (MPa) | (3) | (3) | (3) | (3) | (1.7) | (1.7) | (3) | (3) |
| Temperature | °C. | 24.29 | 25.80 | −33.43 | −33.43 | −38.42 | 17.16 | −33.43 | −50.00 |
| Flow Rate | kg/s | 158.33 | 155.54 | 155.54 | 82.95 | 82.95 | 82.95 | 72.59 | 72.59 |
| $CO_2$ | mol % | 73.1154 | 72.9263 | 72.9263 | 96.8923 | 96.8923 | 96.8923 | 49.6876 | 49.6876 |
| $N_2$ | mol % | 18.8809 | 19.1732 | 19.1732 | 2.1005 | 2.1005 | 2.1005 | 35.7278 | 35.7278 |
| Ar | mol % | 2.9635 | 3.0094 | 3.0094 | 0.3815 | 0.3815 | 0.3815 | 5.5575 | 5.5575 |
| $O_2$ | mol % | 4.8243 | 4.8795 | 4.8795 | 0.6154 | 0.6154 | 0.6154 | 9.0142 | 9.0142 |
| $H_2O$ | ppm | 1239.86 | 0.38 | 0.38 | 0.49 | 0.49 | 0.49 | 0.27 | 0.27 |
| NO | ppm | 239.78 | 36.52 | 36.52 | 7.07 | 7.07 | 7.07 | 65.09 | 65.09 |
| $NO_2$ | ppm | 179.84 | 19.52 | 19.52 | 39.27 | 39.27 | 39.27 | 0.37 | 0.37 |
| $N_2O$ | ppm | 299.73 | 39.65 | 39.65 | 53.89 | 53.89 | 53.89 | 25.83 | 25.83 |
| CO | ppm | 199.82 | 20.29 | 20.29 | 2.63 | 2.63 | 2.63 | 37.42 | 37.42 |
| Stream | — | 62 | 38 | 44 | 42 | 46 | 68 | 70 | 74 |
| Pressure | bar | 29.7 | 29.65 | 29.65 | 1.1 | 1.1 | 29.65 | 1.1 | 29.7 |
|  | (MPa) | (3) | (3) | (3) | (0.1) | (0.1) | (3) | (0.1) | (3) |
| Temperature | °C. | −50.00 | 17.16 | 17.16 | 17.16 | — | 300.00 | 4.25 | −50.00 |
| Flow Rate | kg/s | 46.18 | 46.18 | 25.16 | 21.02 | 23.82 | 25.16 | 25.16 | 26.41 |

TABLE 3-continued

Embodiment of FIG. 5 (with catalyst)

| | | | | | | | | | |
|---|---|---|---|---|---|---|---|---|---|
| CO$_2$ | mol % | 28.9121 | 28.9121 | 7.1788 | 62.0768 | 64.7221 | 7.1788 | 7.1788 | 96.0348 |
| N$_2$ | mol % | 50.5364 | 50.5364 | 72.7788 | 16.5951 | 14.9997 | 72.7788 | 72.7788 | 2.6919 |
| Ar | mol % | 7.8218 | 7.8218 | 9.7107 | 4.9394 | 4.4300 | 9.7107 | 9.7107 | 0.5061 |
| O$_2$ | mol % | 12.7140 | 12.7140 | 10.3124 | 16.3788 | 14.6239 | 10.3124 | 10.3124 | 0.7605 |
| H$_2$O | ppm | 0.17 | 0.17 | 0.00 | 0.43 | 8079.59 | 0.00 | 0.00 | 0.49 |
| NO | ppm | 89.02 | 89.02 | 110.52 | 56.22 | 50.45 | 110.52 | 110.52 | 11.68 |
| NO$_2$ | ppm | 0.00 | 0.00 | 0.00 | 0.00 | 2375.65 | 0.00 | 0.00 | 1.19 |
| N$_2$O | ppm | 14.55 | 14.55 | 18.07 | 9.19 | 1707.85 | 18.07 | 18.07 | 51.00 |
| CO | ppm | 52.66 | 52.66 | 65.38 | 33.25 | 29.83 | 65.38 | 65.38 | 3.42 |
| Stream | — | 76 | 78 | 80 | 82 | 84 | 86 | 36 | |
| Pressure | bar | 29.65 | 8.664452 | 8.464452 | 17.35495 | 17.35495 | 110 | 110 | |
| | (MPa) | (3) | (0.8) | (0.8) | (1.7) | (1.7) | (11) | (11) | |
| Temperature | °C. | −42.97 | −54.56 | 17.16 | 73.80 | 25.00 | 185.26 | 43.00 | |
| Flow Rate | kg/s | 26.41 | 26.41 | 26.41 | 26.41 | 26.41 | 109.35 | 109.35 | |
| CO$_2$ | mol % | 96.0348 | 96.0348 | 96.0348 | 96.0348 | 96.0348 | 96.6848 | 96.6848 | |
| N$_2$ | Ml% | 2.6919 | 2.6919 | 2.6919 | 2.6919 | 2.6919 | 2.2436 | 2.2436 | |
| Ar | mol % | 0.5061 | 0.5061 | 0.5061 | 0.5061 | 0.5061 | 0.4117 | 0.4117 | |
| O$_2$ | mol % | 0.7605 | 0.7605 | 0.7605 | 0.7605 | 0.7605 | 0.6505 | 0.6505 | |
| H$_2$O | ppm | 0.49 | 0.49 | 0.49 | 0.49 | 0.49 | 0.49 | 0.49 | |
| NO | ppm | 11.68 | 11.68 | 11.68 | 11.68 | 11.68 | 8.18 | 8.18 | |
| NO$_2$ | ppm | 1.19 | 1.19 | 1.19 | 1.19 | 1.19 | 30.05 | 30.05 | |
| N$_2$O | ppm | 51.00 | 51.00 | 51.00 | 51.00 | 51.00 | 53.19 | 53.19 | |
| CO | ppm | 3.42 | 3.42 | 3.42 | 3.42 | 3.42 | 2.82 | 2.82 | |

Regarding the first simulation of FIG. 5, it should be noted that the quantities of NO$_2$ and N$_2$O in carbon dioxide product are reduced with respect to the carbon dioxide product in FIG. 4. In this connection, sending less NO$_2$ to the low temperature carbon dioxide purification system reduces the possibility of freeze out problems.

In the second simulation, the quantities of CO and NO present in the vent stream 70 are now significantly less than in the comparative example.

It will be appreciated that the invention is not restricted to the details described above with reference to the preferred embodiments but that numerous modifications and variations can be made without departing form the spirit or scope of the invention as defined in the following claims.

The invention claimed is:

1. A method for removing at least nitrogen dioxide (NO$_2$) from a carbon dioxide feed gas comprising NO$_x$ and at least one "non-condensable" gas as contaminants, said method comprising:
   passing said carbon dioxide feed gas at a first elevated pressure through a first adsorption system that selectively adsorbs at least NO$_2$ to produce at least substantially NO$_2$-free carbon dioxide gas, said first adsorption system comprising at least one adsorbent bed;
   purifying said at least substantially NO$_2$-free carbon dioxide gas to produce purified carbon dioxide and carbon dioxide-lean vapor comprising at least a major portion of said non-condensable gas(es);
   recovering carbon dioxide from said carbon dioxide-lean vapor at a second elevated pressure to produce carbon dioxide-rich gas and carbon dioxide-depleted gas that is rich in said non-condensable gas(es); and
   using at least a portion of said carbon dioxide-rich gas to regenerate at least a portion of said adsorbent bed(s) of said first adsorption system and produce NO$_2$-enriched regeneration gas.

2. The method of claim 1, wherein said first adsorption system also adsorbs at least one other oxide of nitrogen from said feed gas such that said at least substantially NO$_2$-free carbon dioxide gas is at least substantially NO$_x$-free, and said NO$_2$-enriched regeneration gas comprises NO.

3. The method of claim 1, wherein said first adsorption system comprises a NO-oxidation catalyst to oxidize NO in the presence of oxygen (O$_2$) to produce NO$_2$ which is adsorbed by said first adsorption system, and desorbed on regeneration of said adsorbent bed(s) such that said NO$_2$-enriched regeneration gas comprises additional NO$_2$.

4. The method of claim 1, wherein said first adsorption system comprises a NO-reduction catalyst to reduce NO in the presence of a reducing gas to produce nitrogen (N$_2$), said at least substantially NO$_2$-free carbon dioxide gas being enriched with N$_2$.

5. The method of claim 1, wherein said carbon dioxide feed gas comprises N$_2$O as a further contaminant and said first adsorption system adsorbs N$_2$O from said feed gas such that said at least substantially NO$_2$-free carbon dioxide gas is at least N$_2$O-lean, and said NO$_2$-enriched regeneration gas comprises N$_2$O.

6. The method of claim 1, wherein said carbon dioxide feed gas comprises water as a further contaminant and said first adsorption system adsorbs water from said feed gas such that said at least substantially NO$_2$-free carbon dioxide gas is at least substantially dry, and said NO$_2$-enriched regeneration gas is wet.

7. The method of claim 1, wherein said carbon dioxide feed gas comprises SO$_x$ as a further contaminant and said first adsorption system adsorbs SO$_x$ from said feed gas such that said at least substantially NO$_2$-free carbon dioxide gas is at least substantially SO$_x$-free, and said NO$_2$-enriched regeneration gas comprises SO$_x$.

8. The method of claim 1, wherein said carbon dioxide feed gas comprises carbon monoxide (CO) as a further contaminant and said first adsorption system adsorbs CO from said feed gas such that said at least substantially NO$_2$-free carbon dioxide gas is at least substantially CO-free.

9. The method of claim 8, wherein said first adsorption system comprises a CO-oxidation catalyst to oxidize CO in the presence of O$_2$ to produce carbon dioxide such that said at least substantially NO$_2$-free carbon dioxide gas comprises additional carbon dioxide.

10. The method of claim 1, wherein carbon dioxide is recovered from said carbon dioxide-lean vapor at said second elevated pressure by permeation across a carbon dioxide-selective permeable membrane to produce said carbon dioxide-rich gas as a permeate fraction and said carbon dioxide-depleted gas as a retentate fraction.

11. The method of claim 1, wherein carbon dioxide is recovered from said carbon dioxide-lean vapor at said second elevated pressure by selective adsorption using a second adsorption system comprising at least one adsorbent bed that selectively adsorbs carbon dioxide to produce said carbon dioxide-depleted gas, said carbon dioxide-rich gas being produced on regeneration of said bed(s) of said second adsorption system.

12. The method of claim 1, wherein said carbon dioxide feed gas comprises $O_2$ as a further contaminant, a portion of said $O_2$ being recovered with carbon dioxide such that said carbon dioxide-rich gas comprises $O_2$ and said $NO_2$-enriched regeneration gas comprises $O_2$.

13. The method of claim 12, wherein said carbon dioxide-lean vapor has a first $O_2$ concentration and said carbon dioxide-rich gas has a second $O_2$ concentration that is greater than said first $O_2$ concentration in said carbon dioxide-lean vapor.

14. The method of claim 1, wherein said carbon dioxide feed gas has a first flow rate and said portion of said carbon dioxide-rich gas used to regenerate said adsorbent bed(s) has a second flow rate that is from about 5% to about 25% of said first flow rate of said carbon dioxide feed gas.

15. The method of claim 1, wherein said carbon dioxide-rich gas is used to regenerate of all said adsorbent bed(s) of said first adsorption system.

16. The method of claim 1, wherein said carbon dioxide-rich gas is used to regenerate a portion of said adsorbent bed(s) of said first adsorption system, the remaining portion of said bed(s) being regenerated using at least one other regenerating gas.

17. The method of claim 1, wherein said carbon dioxide feed gas is, or is derived from, flue gas generated in an oxyfuel combustion system, said method comprising recycling at least a portion of said $NO_2$-enriched regeneration gas, or a regeneration gas derived therefrom, to said oxyfuel combustion system.

18. The method of claim 17, wherein said $NO_2$-enriched regeneration gas is at a pressure sufficient for recycling said gas to said oxyfuel combustion system without additional compression.

19. The method of claim 17, comprising cooling said $NO_2$-enriched regeneration gas to produce aqueous condensate and removing said aqueous condensate prior to recycling said regeneration gas.

20. The method of claim 17, comprising heating said $NO_2$-enriched regeneration gas to prevent production of aqueous condensate prior to recycling said regeneration gas.

21. A method for removing water and at least $NO_2$ from carbon dioxide flue gas comprising water, $NO_x$, $O_2$ and $N_2$ as contaminants, generated an oxyfuel combustion system, said method comprising:
passing said carbon dioxide flue gas at a first elevated pressure through a first adsorption system that selectively adsorbs water and $NO_2$ to produce dry substantially $NO_2$-free carbon dioxide gas, said first adsorption system comprising at least one adsorbent bed;
purifying said substantially $NO_2$-free carbon dioxide gas below 0° C. to produce purified carbon dioxide as a liquid and carbon dioxide-lean vapor comprising at least a major portion of said $O_2$ and $N_2$;
recovering carbon dioxide and $O_2$ from said carbon dioxide-lean vapor at a second elevated pressure to produce carbon dioxide-rich gas comprising $O_2$ and carbon dioxide-depleted gas that is rich in $N_2$;
using at least a portion of said carbon dioxide-rich gas to regenerate at least a portion of said adsorbent bed(s) of said first adsorption system and produce $NO_2$-enriched regeneration gas comprising $O_2$ and water; and
recycling at least a portion of said $NO_2$-enriched regeneration gas to said oxyfuel combustion system.

22. An apparatus for removing at least $NO_2$ from a carbon dioxide feed gas comprising $NO_x$ and at least one non-condensable gas as contaminants, said apparatus comprising:
a first adsorption system for selectively adsorbing at least $NO_2$ from said feed gas at a first elevated pressure to produce at least substantially $NO_2$-free carbon dioxide gas, said first adsorption system comprising at least one adsorbent bed;
a carbon dioxide purification system for purifying said at least substantially $NO_2$-free carbon dioxide gas to produce purified carbon dioxide and carbon dioxide-lean vapor comprising at least a major portion of said non-condensable gas(es);
a conduit arrangement for feeding at least substantially $NO_2$-free carbon dioxide gas from said first adsorption system to said carbon dioxide purification system;
a carbon dioxide recovery system for recovering carbon dioxide from said carbon dioxide-lean vapor at a second elevated pressure to produce carbon dioxide-rich gas and carbon dioxide-depleted gas that is rich in said non-condensable gas(es);
a conduit arrangement for feeding carbon dioxide-lean vapor from said carbon dioxide purification system to said carbon dioxide recovery system;
a conduit arrangement for feeding at least a portion of said carbon dioxide-rich gas to said first adsorption system to regenerate at least a portion of said adsorbent bed(s) of said first adsorption system and produce $NO_2$-enriched regeneration gas.

23. The apparatus of claim 22, wherein said carbon dioxide recovery system comprises a carbon dioxide-selective permeable membrane separation system having a permeate side and a retentate side.

24. The apparatus of claim 22, wherein carbon dioxide recovery system comprises a second adsorption system comprising at least one adsorbent bed that selectively adsorbs carbon dioxide.

25. The apparatus of claim 22, comprising:
an oxyfuel combustion system for combusting a fuel in the presence of $O_2$ to produce heat and carbon dioxide flue gas; and
a conduit arrangement for recycling at least a portion of said $NO_2$-enriched regeneration gas from said first adsorption system to said oxyfuel combustion system.

* * * * *